(12) United States Patent
Ferreira et al.

(10) Patent No.: US 8,940,164 B2
(45) Date of Patent: Jan. 27, 2015

(54) ARRANGEMENT OF FILTER ASSEMBLY FOR WATER DISPENSING-STORAGE DEVICE

(75) Inventors: Jean M. Ferreira, Joinville (BR); Jean Carlos Dalchau, Joinville (BR); Atul Dhiman, Chandigarh (IN); Marcos Heinzle, Joinville (BR)

(73) Assignee: Whirlpool S.A., Sao Paulo, SP (BR)

( * ) Notice: Subject to any disclaimer, the term of this patent is extended or adjusted under 35 U.S.C. 154(b) by 1137 days.

(21) Appl. No.: 12/988,141

(22) PCT Filed: Feb. 10, 2009

(86) PCT No.: PCT/BR2009/000032
§ 371 (c)(1),
(2), (4) Date: Nov. 28, 2011

(87) PCT Pub. No.: WO2009/127025
PCT Pub. Date: Oct. 22, 2009

(65) Prior Publication Data
US 2012/0067803 A1 Mar. 22, 2012

(30) Foreign Application Priority Data
Apr. 16, 2008 (BR) .................................. 0802055-8

(51) Int. Cl.
*B01D 35/30* (2006.01)
*F25D 23/12* (2006.01)
(52) U.S. Cl.
CPC ......... *F25D 23/126* (2013.01); *C02F 2201/006* (2013.01); *F25D 2323/121* (2013.01)
USPC .......................... 210/232; 210/172.1; 210/483
(58) Field of Classification Search
CPC ................. C02F 2307/04; C02F 1/003; C02F 2201/002; C02F 2201/004; B01D 2307/10; B01D 35/306; B01D 2201/4084; B01D 2201/4023; B01D 2201/304; B01D 2201/305; A47J 31/605; A47J 31/446; B67D 2210/00036
USPC .......... 210/172.1, 513, 483, 348, DIG. 17, 232
See application file for complete search history.

(56) References Cited

U.S. PATENT DOCUMENTS

| 2,619,895 | A | * | 12/1952 | Schott ............................. 99/292 |
| 6,574,984 | B1 | | 6/2003 | McCrea et al. |
| 8,377,292 | B2 | * | 2/2013 | Patera et al. .................. 210/110 |

FOREIGN PATENT DOCUMENTS

EP  1 190 983  11/2003

OTHER PUBLICATIONS

International Search Report dated Jan. 26, 2010 (2 pages).

* cited by examiner

*Primary Examiner* — Nam Nguyen
*Assistant Examiner* — Claire Norris
(74) *Attorney, Agent, or Firm* — Holland & Knight LLP; Brian J. Colandreo, Esq.; Jeffrey T. Placker, Esq.

(57) ABSTRACT

The assembly arrangement comprises a reservoir (10) on which a filling container (20) having a bottom wall (21) is mounted; and a filter(30) mounted to said bottom wall (21) which presents a seat portion (24) provided of one or more windows (25*a*) and bearing a stopper element (40) provided of at least one opening (41 *a*) and moveable between a closed position and an open position of the seat portion (24). The filter (30) is upwardly seated against the bottom wall (21) and coupled to the stopper element (40), allowing the filter (30) to be moved between a release and assembly position, with the stopper element in the closed position, and an assembled position, moving the stopper element (40) to its open position and to which remains axially hold against said bottom wall (21), communicating inlet orifices (31*a*) of the filter (30) to the interior of the filling container (20).

28 Claims, 24 Drawing Sheets

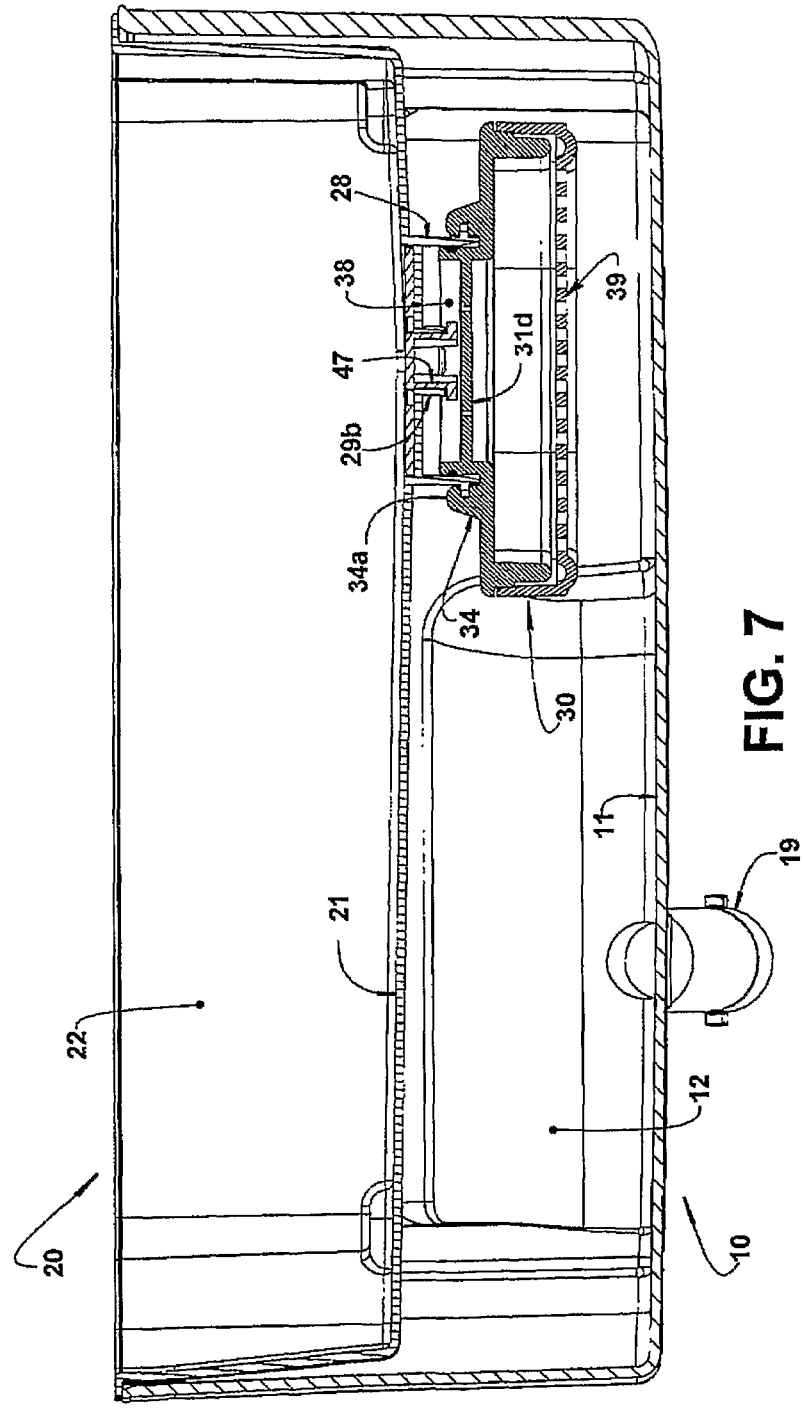

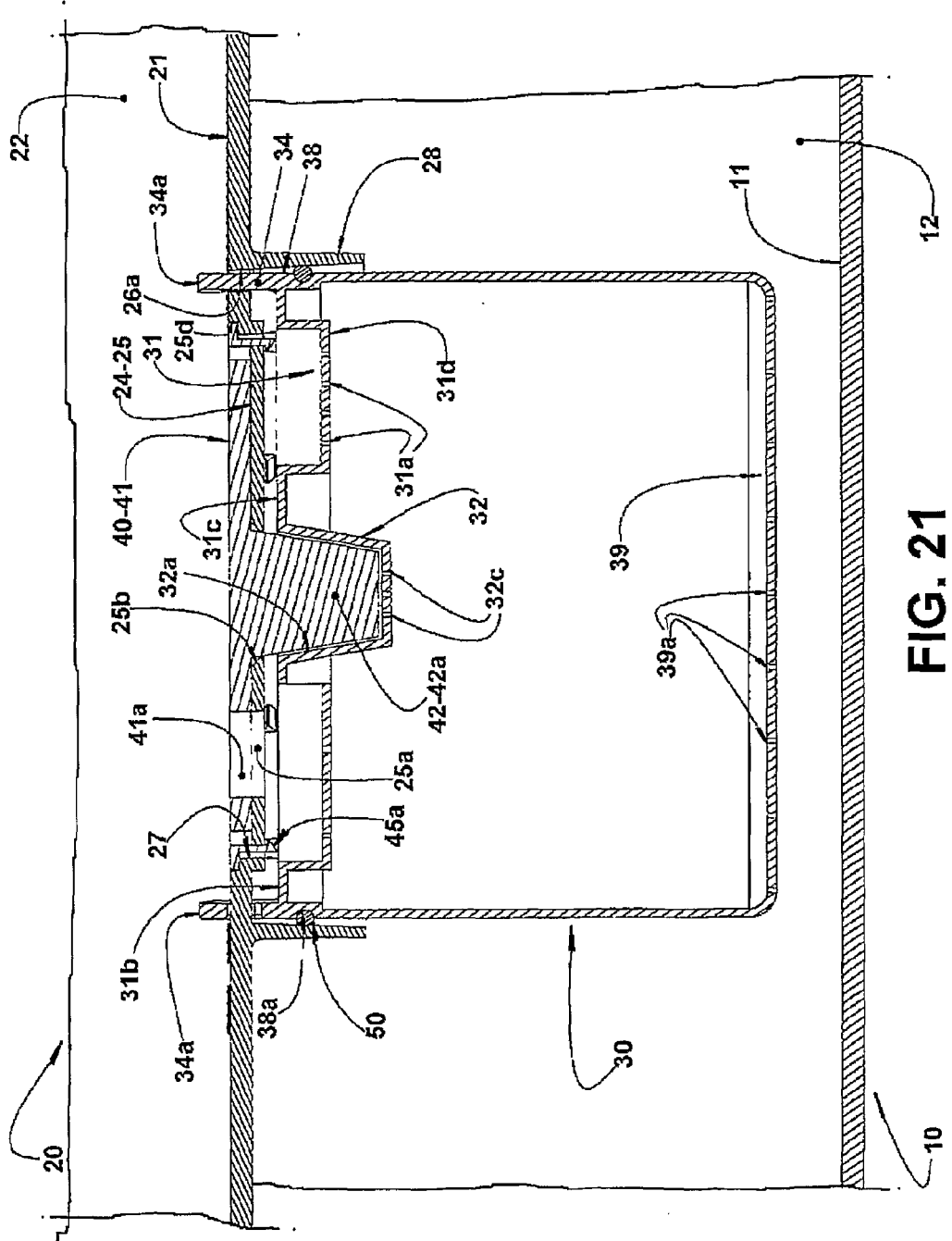

ARRANGEMENT OF FILTER ASSEMBLY FOR WATER DISPENSING-STORAGE DEVICE

FIELD OF THE INVENTION

The present invention refers to a constructive arrangement for providing the assembly of a filter to a water dispensing-storing device to be generally provided in the interior of a domestic refrigerator and comprising a water reservoir, provided of an upper opening and maintained in fluid communication with the outlet faucet to be actuated by the user, to receive the water stored in the reservoir.

This kind of device is normally provided of a filling container or chamber, having a bottom wall which is removably mounted over the upper opening of the reservoir, so as to close it, and a user replaceable filter mounted to the bottom wall of the filling container and defining the unique gravitational fluid communication between the filling container and the reservoir.

BACKGROUND OF THE INVENTION

Several different technical solutions are known to the art for water dispensing-storing devices mounted to the interior of refrigerators, in the inner portion of the cabinet body or the inner liner of the door of the refrigeration apparatus, in order to allow the user to gravitationally receive the water, by means of a faucet connected to the water reservoir of the device and arranged in the interior of the refrigerator or in a recess provided in the outer side of the door.

Independent of the type of assembly used in the faucet to be operated by the user, some of these known constructions comprises a water reservoir, adequately mounted to the interior of the cabinet or the inner liner of the door, so as to be removable for cleaning and maintenance operations, the reservoir being provided of an upper opening to be closed, at least in part, by the bottom wall of a filling container, removably seated over the water reservoir.

The filling container is generally configured in the form of a tray and sized to allow the user to deliver, in its interior, a predetermined amount of water to be gravitationally transferred to the water reservoir by means of a filter removably mounted to the bottom wall of the filling container, generally on the latest, and which consists of the unique filtering and gravitational fluid communication between the filling container and the water reservoir.

The above mentioned constructive arrangement allows the user to have filtered water in the interior of the reservoir and to be gravitationally released by the dispensing faucet, positioned in the interior of the refrigerated cabinet or even in the outer portion of the refrigerator's door.

One construction of such type is disclosed in document U.S. Pat. No. 6,574,984 B1. In such construction, the filter is removably mounted by means of the bottom wall of the filling container, crossing said wall downwardly, no particular construction is established for providing a secure and fluid tight assembly to the bottom wall of the filling container, so as to indicate to the user the correct adaptation of the filter and the certainty that the filter element consists of the unique and possible gravitational fluid communication between the filling container and the water reservoir.

Further according to the previous construction, the filter is simply fitted, by means of its own weight, to the seat provided in the bottom wall of the filling container, the sealing between the filter and said bottom wall being obtained solely by the compression of the filter peripheral flange against the edge, in the form of seat, of a respective opening provided in the bottom wall of the filling container.

These and other constructions of the prior art, besides having the same basic construction, do not provide a secure and efficient assembly of the filter to the bottom wall of the filling container, for granting an adequate tightness in the connection between the filter and the bottom wall of the filling container and further a clear visual indication to the user that the filter assembly was carried out in a correct way.

SUMMARY OF THE INVENTION

In view of the constructive characteristics of the known water dispensing-storing devices, an objective of the present invention consists in providing an assembly arrangement to the filter of said devices, so as to guarantee a quick, easy and secure adaptation of the filter to the bottom wall of the filling container, producing a clear visual indication to the user that the filter assembly was carried out in the correct way and with the needed tightness, so as to cause the filter to define the unique gravitational fluid communication between the filling container and the water reservoir.

According to a filter assembly arrangement, object of the present invention, applied to a water dispensing-storing device considered herein, the bottom wall of the filling container presents a seat portion provided of at least one window and, generally, a plurality of windows.

The assembly arrangement in question comprises a stopper element having at least one opening and being axially held and supported against the seat portion, so as to be moveable between a closed position, wherein the window is blocked at the seat portion and an open position, wherein an opening of said stopper element becomes axially aligned with a respective seat portion window.

The filter, normally used in the present water dispensing-storing device, is upwardly provided of water inlet orifices and hermetically seated against the bottom wall of the filling container, so as to allow the filter to be selectively moved between an assembly and release position and an assembled position, in which remains axially held against the bottom wall of the filling container, communicating the latest with the reservoir, by means of the filter of the seat portion window and of a respective opening of the stopper element moved to the open position.

In a preferred configuration, the filter, when seated against the bottom wall of the filling container, is coupled to the stopper element, so as to move the latest from the closed position to the open position and further from the open position to the closed position, when the filter is moved from the release and assembly position to the assembled position and from the latest to the first, respectively.

The above mentioned construction allows the filter to be easily adapted to the bottom wall of the filling container, by means of a first axial movement of approximation and seat, followed by a movement of displacement, for example, of a rotation by a predetermined angle, sufficient to promote the axial retention of the filter against said bottom wall and further, preferably, the movement of the stopper element to a position in which the axial alignment occurs between the seat portion window and the respective stopper device opening, communicating the interior of the filling container to the water inlet orifices of the filter positioned in the interior of the water reservoir, so as to release therein, by means of the water outlet orifices, the water gravitational flow being filtered.

In the construction where the filter is not coupled to the stopper, the operational movement of the latest may be achieved by the user direct manual operation.

BRIEF DESCRIPTION OF THE DRAWINGS

The invention will be disclosed hereinbelow, making reference to the appended drawings, given as an example of a possible concretization of the assembly arrangement in question, wherein:

FIG. 7 is a cross-sectional view of the set of components, according to the first configuration and taken along line VII-VII of FIG. 6;

FIG. 21 is a partial cross-sectional view of the set of components, taken along line XXI-XXI of FIG. 18.

DETAILED DESCRIPTION OF THE INVENTION

Figure 1:
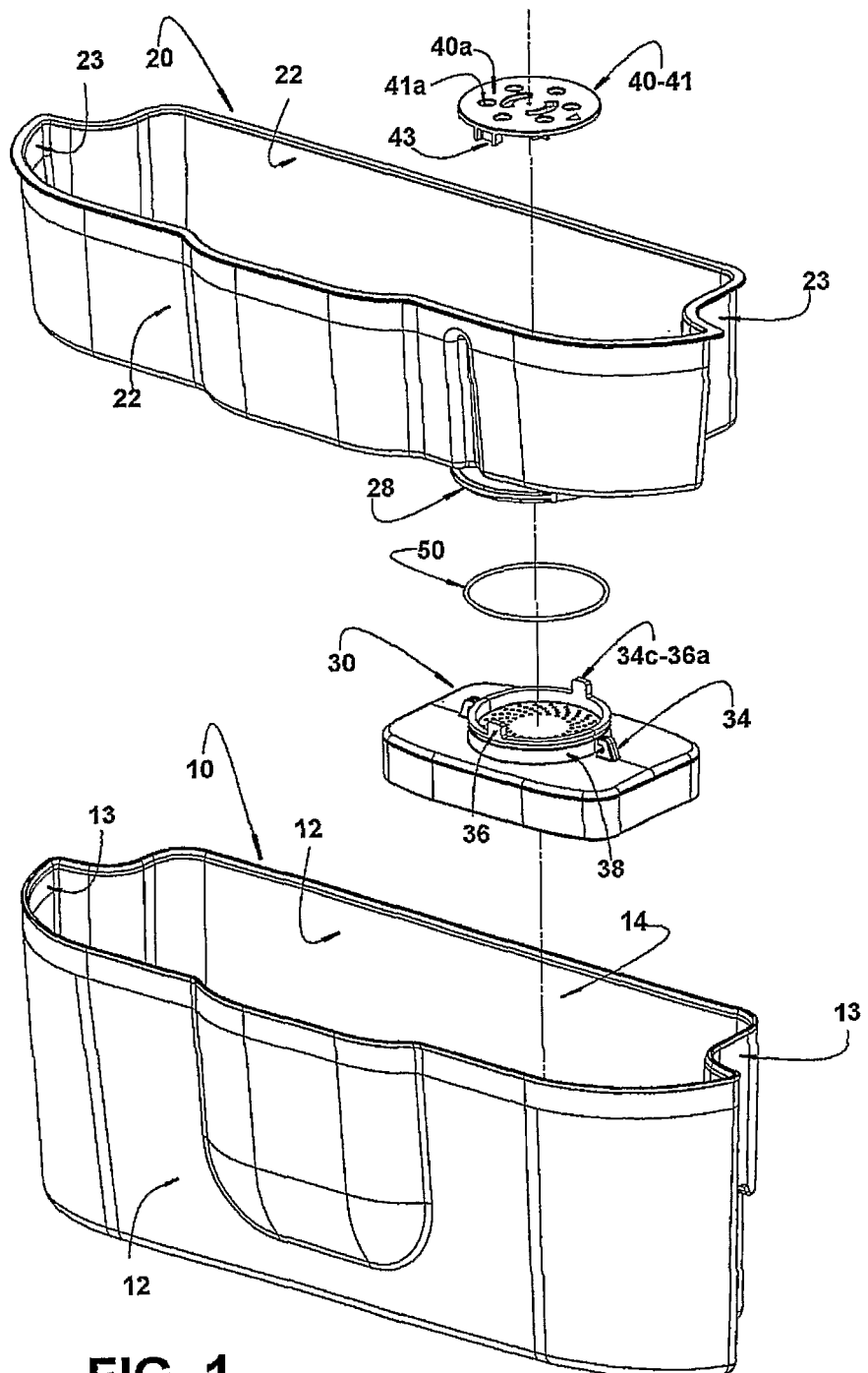
FIG. 1 is an exploded top perspective view of the component parts of the assembly arrangement of the invention, according to a first configuration.

With reference to the attached drawings and previously mentioned, the assembly arrangement in question is applied to a water dispensing-storing device of the type which comprises a reservoir 10, generally parallelepipedical and molded in plastics material, having bottom walls 11, side walls 12 and end walls 13 and an upper opening 14 which, in the constructive example, has a shape which substantially corresponds to the rectangular shape of the reservoir 10.

In the illustrated configuration, the reservoir 10 incorporates, downwardly, and projecting backwards, a tubular projection 19, configured to gravitationally conduct the water contained within the reservoir 10 to a faucet (not illustrated) arranged in the interior of the refrigerator or in a recess provided in the outer side of the refrigerator door.

The water dispensing-storing device further comprises a filling container 20, also generally molded in plastic material, defining a type of tray configured to make it easy to deliver a certain amount of water to be stored in the device, said filling container 20 comprising a bottom wall 21, end 23 and side walls 22, opposed two by two, configuring a contour similar to the one of the reservoir 10, such that the bottom wall 21 of the filling container can be removably assembled over the upper opening 14 of the reservoir 10, maintaining it closed.

A filter 30, generally in a cartridge form and generally with a cylindrical or rectangular prismatic shape, is removably assembled on the bottom wall 21 of the filling container 20, in order to define a single gravitational fluid communication between the filling container 20 and the reservoir 10.

According to the invention, the bottom wall 21, of the filling container 20, presents a seat portion 24 which, in the construction illustrated, is defined by a recess 25 provided on the bottom wall 21 of the filling container 20, being internal to the latter one, said recess 25 being provided with at least a window 25a arranged in a generally eccentric way. In the configurations illustrated, the bottom wall 21 of the filling container 20 incorporates, in a lower way, a circular tubular projection 28, circumscribed by the seat portion 24, generally defined by the recess 25.

The assembly arrangement in question further comprises a stopper element 40 presenting opposed end faces 40a, 40b and having at least an opening 41a and being axially retained and supported against the seat portion 24, in order to be able to be moved from a closed position, where it blocks the window 25a of the seat portion 24, to an open one, where the opening 41a of said stopper element 40 is axially aligned with a respective window 25a of the seat portion 24.

In the configurations illustrated, a stopper disc 41, preferably constructed with injected plastic material and which is seated against the seat portion 24, defines the stopper element 40. The seat portion 24 being defined by the recess 25, the stopper disc 41 is seated and rotatably supported in the interior of said recess 25, the sizing of such two component parts is made in such a way to allow the upper face of the stopper disc 41 to be in a plan not higher than the one of the bottom wall 21 of the filling container 20.

Figure 18:
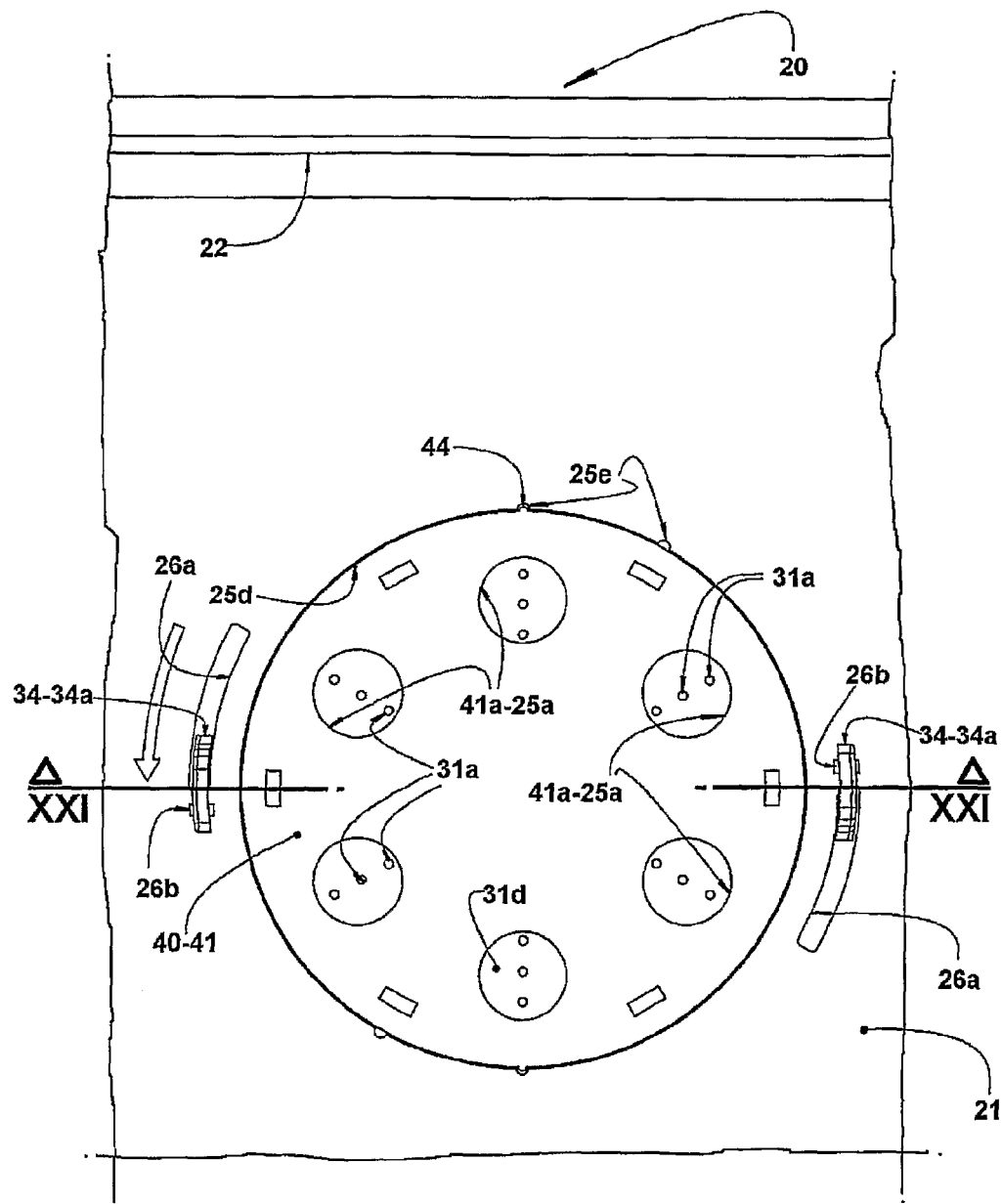
FIG. 18 is a partial top view of the assembly arrangement in question according to said third constructive solution, illustrating the filter in the assembled position under the filling container and with the stopper element in the open position.
Figure 19:
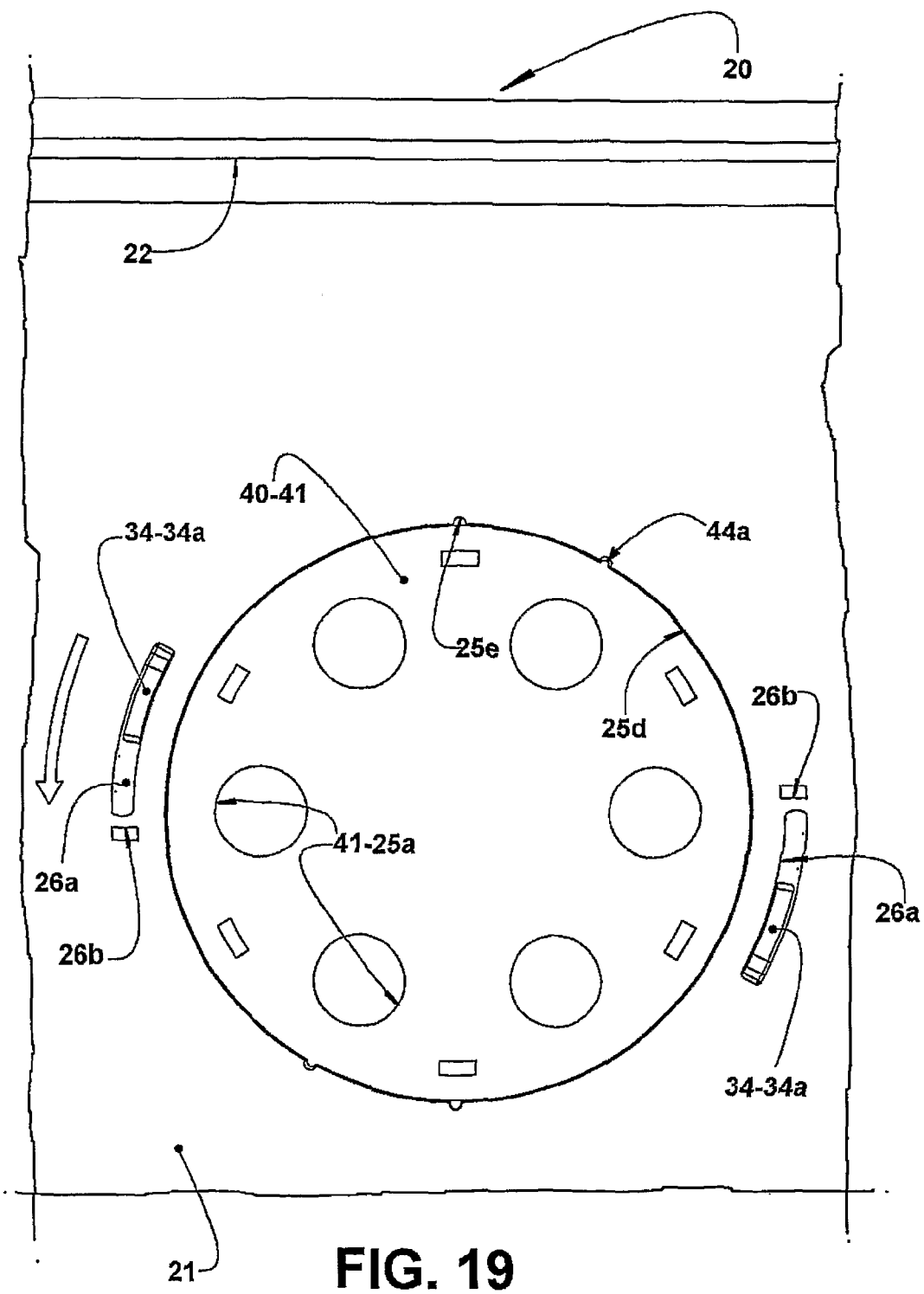
FIG. 19 is a view similar to that of FIG. 11, however illustrating the stopper element in the closed position and the filter in the release position.
Figure 20:
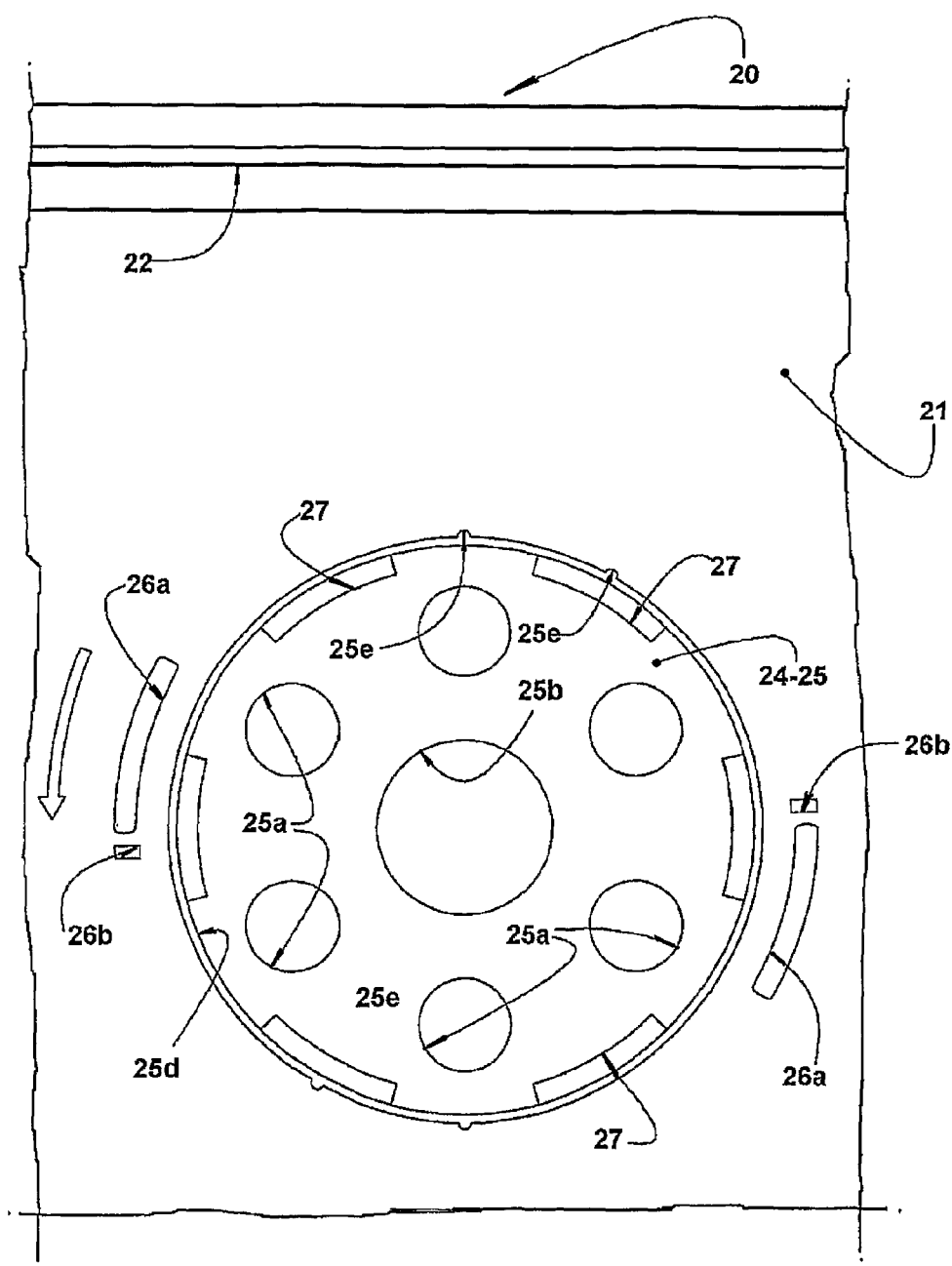
FIG. 20 is a top view of the bottom wall portion of the filling container, wherein the third configuration of the seat portion is provided, devoid of the stopper element and the filter.

The filter 30, as already mentioned, is preferably constructed in the form a replaceable cartridge, presenting an upper face 31 provided, medially, with water inlet orifices 31 and configured to be hermetically and peripherally seated and axially retained against the bottom wall 21 of the filling container 20, under the seat portion 24. The upper face 31 of the filter 30, as described in more details hereinafter, is also generally configured to allow the filter 30 to be coupled to the stopper element 40 during seating of the filter 30 against the bottom wall 21 of the filling container 20, in order that the filter 30 be moved, for example rotated, together with the stopper element 40, from a assembly and release position (illustrated on the FIGS. 6B, 12 and 19), with the stopper element 40 kept on the closed position, to an assembled position, where it moves the stopper element 40 into its open position and where it remains axially retained against the bottom wall 21 of the filling container 20 (see FIGS. 6A, 11 and 18).

It should be understood that the filter 30 could be constructed in order to be assembled only on the filling container 20, without being coupled with the stopper element 40, which, in this case, should be moved directly by manual actuation, by the user.

The filter 30 can be made in order that its upper face 31 comprises a tubular projection 31b to be coupled with the bottom wall 21 of the filling container 20, and a recessed median portion 31d, circumscribed by the tubular projection 31b and wherein the water inlet orifices 31a are provided into the interior of the filter 30.

According with a first configuration of the invention, for the axial retention of the filter 30 to the filling container 20, the upper face 31 of the filter 30, incorporates, externally to the tubular projection 31b, two or more locking latches 34, in the shape of an inverted L and with the upper horizontal leg 34a spaced apart from said tubular projection 31b of the upper face 31 of the filter 30. In this first configuration, the cylindrical tubular projection 28 of the bottom wall 21 externally incorporates a latch receiving means 28a, which takes the shape of a circumferential flap 28b provided with cutouts 28c, with the width slightly larger than the one of the locking latches 34.

With such construction, the filter 30 can be axially moved against the bottom wall 21, in a position wherein its locking latches 34 coincide with the respective cutouts 28c of the circumferential flap 28a of the cylindrical tubular projection 28, allowing the locking latches 34 to have its upper horizontal legs 34a positioned in a level higher than the one of the circumferential flap 28b and the filter 30 can thus be rotated, in a predetermined way and by a certain angle, around its axes, so that the upper horizontal legs 34a of the locking latches 34 be seated over the circumferential flap 28b, axially locking the filter 30 on the bottom wall 21 of the filling container 20.

The circumferential flap 28b incorporates an upper stop 28d, adjacent to each one of the cutouts 28c and which keeps the filter 30 from being rotated in an opposed sense to the one needed to displace it from the assembly and release position, to the assembled position, defined by means of stop provided on the filter 30 and on the filling container 20, as described hereinafter.

In order that the water held in the filling container 20 can flow into the interior of the reservoir 10, exclusively through the filter 30, a sealing ring 50 is provided, (see FIGS. 1, 2, 7, 7A, 14 and 21), generally in elastomer material, built to be compressed between the filter 30 and the bottom wall 21 of the filling container 20, when the filter 30 is taken to the assembled position.

The sealing ring 50 is compressed between the cylindrical tubular projection 28 and a portion of the cylindrical side wall 38 of the filter, involving the tubular projection 31b of the upper face 31 of said filter 30. The sealing ring 50 is built to be partially housed in a peripheral channel 38a provided on said portion of the cylindrical side wall 38 of the filter 38. Thus, it is avoided the passage of the water from the interior of the filling container 20 into the interior of the reservoir 10, which is not carried out through the filter 30, and in the construction illustrated it should be observed that the filter 30 presents a lower end face 39 provided with a plurality of water outlet orifices 39a, as illustrated on the FIGS. 2, 7, 7A, 14 and 21 of the appended drawings.

As already previously mentioned, the construction preferred and illustrated on the appended drawings, provides the coupling between the filter 30 and the stopper element 40, so that the displacement of the filter 30, between its operational positions, produces the corresponding operational displacement of the stopper element 40.

In the construction illustrated on the FIGS. 1 to 7A, said coupling is rotational, due to the fact that the stopper element can take the shape of a stopper disc 41. In this case, the upper face 31 of the filter 30 incorporates preferably projecting from the tubular projection 31b of said upper face 31, two or more axial latches 36, the recess 25 of the bottom wall 21 of the filling container 20, is provided with the same number of passing slots 26a (see FIG. 2A), arranged angularly spaced apart from each other along a circular alignment peripheral and internal to the recess 25, each passing slot 26a receives a respective axial latches 36, the end 36a of which is loosely fitted in a respective housing 43 provided in a lower way to the stopper element 40, more particularly, on the stopper disc 41.

Thus, when the filter 30 is axially seated against the bottom wall 21 of the filling container 20, its axial latches 36 cross, each one, a respective passing slot 26a of the recess 25, in order to have its end 36a housed, with a small clearance, on a respective housing 43 of the stopper disc 41.

With the above construction, when the filter 30 is moved, that is, rotated around its axis, its axial latches 36 are circumferentially moved along the passing slots 26a, causing, with the engaging means 34c (see FIG. 5), defined by its ends 36a, the angular displacement of the stopper disc 41 on the seat portion 24, that is, in the interior of the recess 25.

In the construction described above and illustrated on FIGS. 1 to 7A, the filter 30 is axially locked to the bottom wall 21 of the filling container 20 and still rotatably coupled to the stopper disc 41 by means of axial latches 36.

Figure 6:
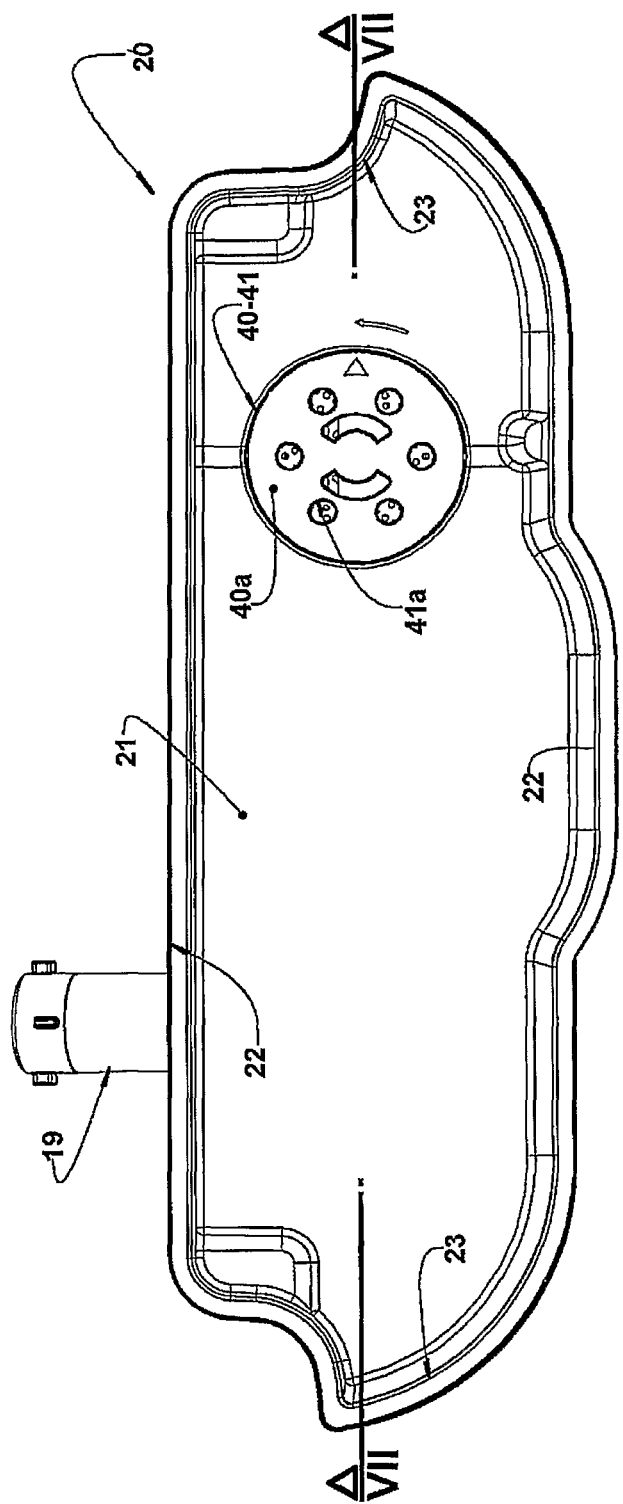
FIG. 6 is a top view of the filling container, with the filter in the assembled position and with the stopper element in the open position.
Figure 6A:
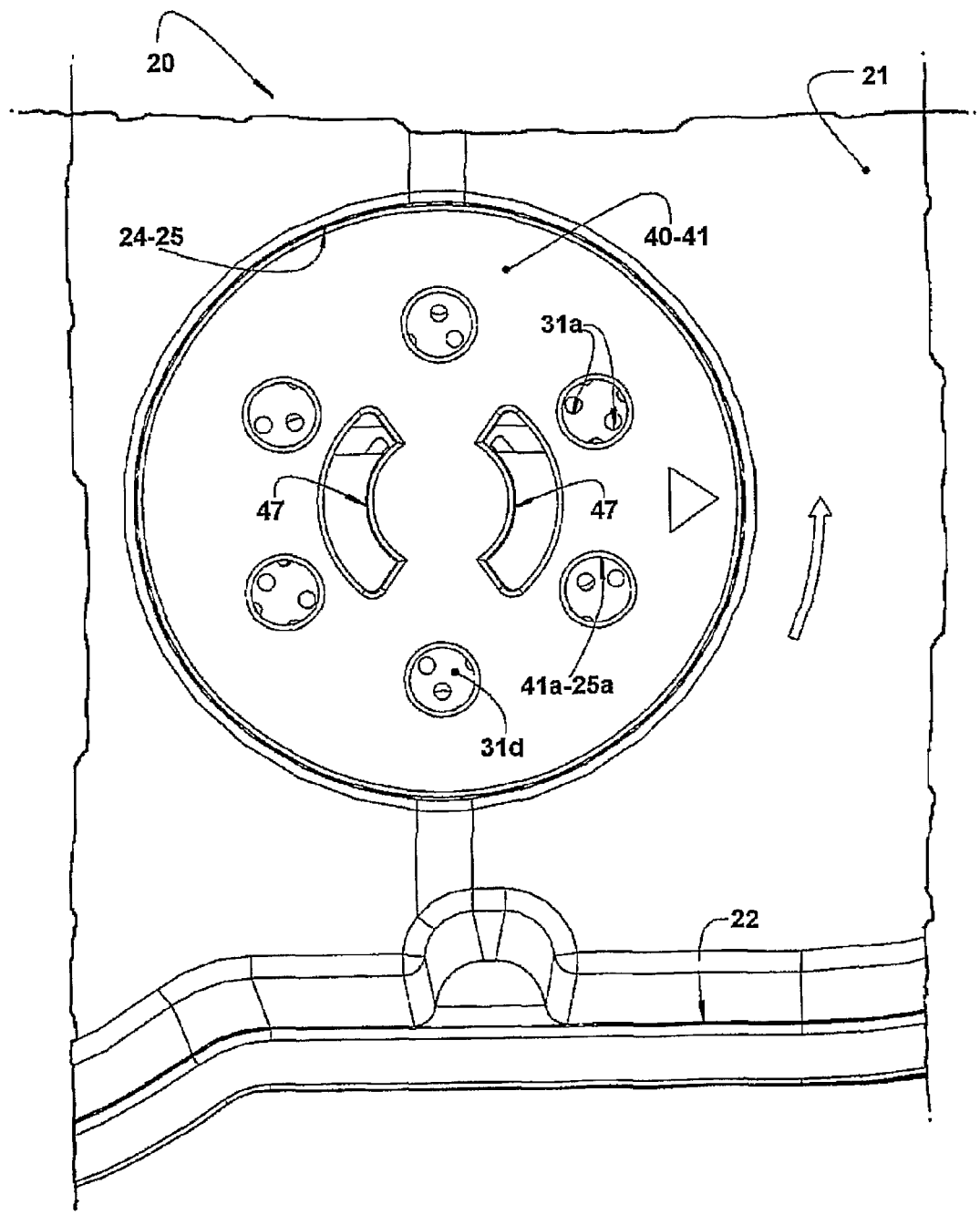
FIG. 6A is an enhanced detail of part of FIG. 6.
Figure 6B:
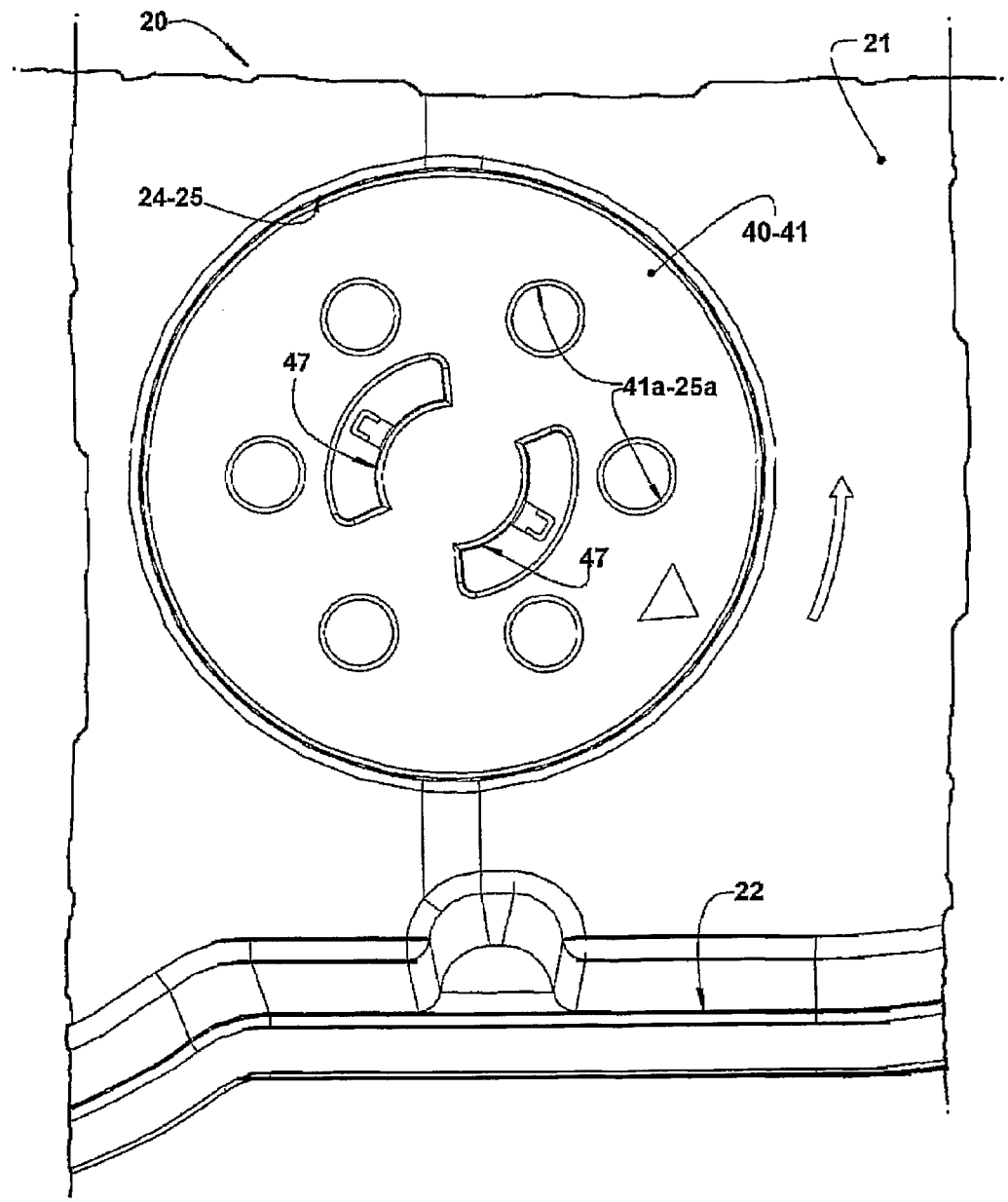
FIG. 6B is a view similar to that of FIG. 6A, however illustrating the stopper element in the closed position and with the filter in the release position.

When the filter 30 is rotated, from its assembly and release position to its assembled position, illustrated on FIGS. 6 and 6A, it takes with it the stopper disc 41 to the open condition, also illustrated on the same figures, with the graphical representation of the water inlet orifices 31a of the filter 30, visible during the axial alignment of the openings 41a of the stopper disc 40 with the respective windows 25a of the recess 25 which defines the seat portion 24.

The angular displacement path of the filter 30 and stopper disc 41 set can be defined by the circumferential extension of the passing slots 26a, the ends of which can operate such as stops for the angular displacement of the axial latches 36.

In order that the stopper disc 41 be stabilized on its open and closed positions, and the filter 30 be stabilized on its assembly and release position as well as on its assembled position, the stopper disc 41 incorporates at least a lower axial protuberance 44, while the recess 25 presents two respective axial indents 25c (see FIG. 1A), angularly distant one from the other, so that said lower axial protuberance 44, of the stopper disc 41 be fitted in one and in the other of said axial indents 25c when the stopper disc 41 is rotated from one to the other respectively, of its closed and open positions. Thus, when the filter 30 is rotated, from the assembled position into the assembly and release position, on the sense opposite to the one of the arrows illustrated on FIGS. 6, 6A and 6B, the stopper disc is forced to rotate in the same direction, causing its two lower axial protuberances 44 to be displaced from one of the axial indents 25c into another axial indent 25c of the recess 25, stabilizing and maintaining the stopper disc 41 on the closed position, during the period when the filter 30 is detached from the filling container 20 to be replaced by a new filter 30.

In order to maintain the stopper disc 41 axially locked on the interior of the recess 24, the latter one is centrally provided with a guide hole 29 (see FIGS. 1A and 2A), which is radially expanded by at least a radial slot 29a. On the other hand, the stopper disc 41 incorporates, in a single part, lower claws 47, projecting downwardly, and presenting and defining cylindrical circumferential portions, which are concentric and have the same curvature radius to be fitted in and rotatably supported in the interior of the guide hole 29, crossing over it.

In the construction illustrated, each lower claw 47 is constructed in order to be elastically deformable in a radical direction when forced during its fitting through the respective guide hole 29, each lower claw 47 incorporates an end tooth 47a which is slidably seated under an end annular edge of a tubular shoulder 29b incorporated in a lower way to the bottom wall 21 of the filling container 20, around the guide hole 29, axially locking the stopper disc 41 in the interior of the recess 25, while allowing said stopper disc 41 to be rotated between its closed and open positions, by the corresponding rotation of the filter 30 between its assembly and release position and assembled position, respectively.

Each lower claw 47 further incorporates, externally, a small radical projection 47b, sized to be fitted through a respective radial slot 29a of the guide hole 29, requiring that the stopper disc 41 be assembled in an angular position obligatorily defined by the alignment of the radial projections 47b with the radial slots 29a.

As can be seen from the drawings, the stopper disc 41 and the recess 25 are provided with the same number of windows 25a and openings 41a, respectively, which have been arranged equally spaced from each other according to respective circular alignments having the same radius and concentric to the axis of the set formed by the seat portion 24 and the stopper element 40.

Figure 1A:
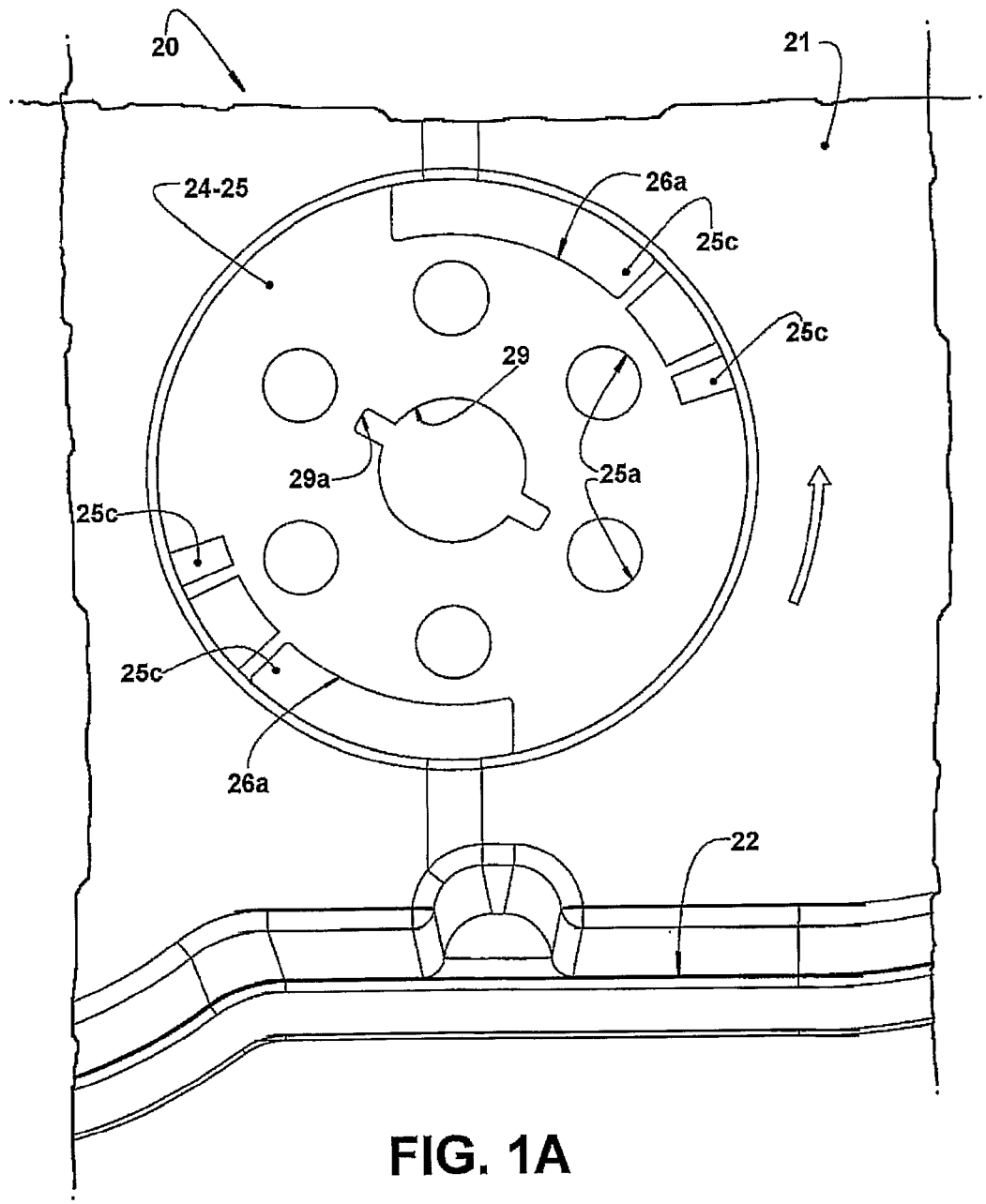
FIG. 1A is an enhanced partial top view of the bottom wall of the filling container, in the seat portion region.
Figure 2:
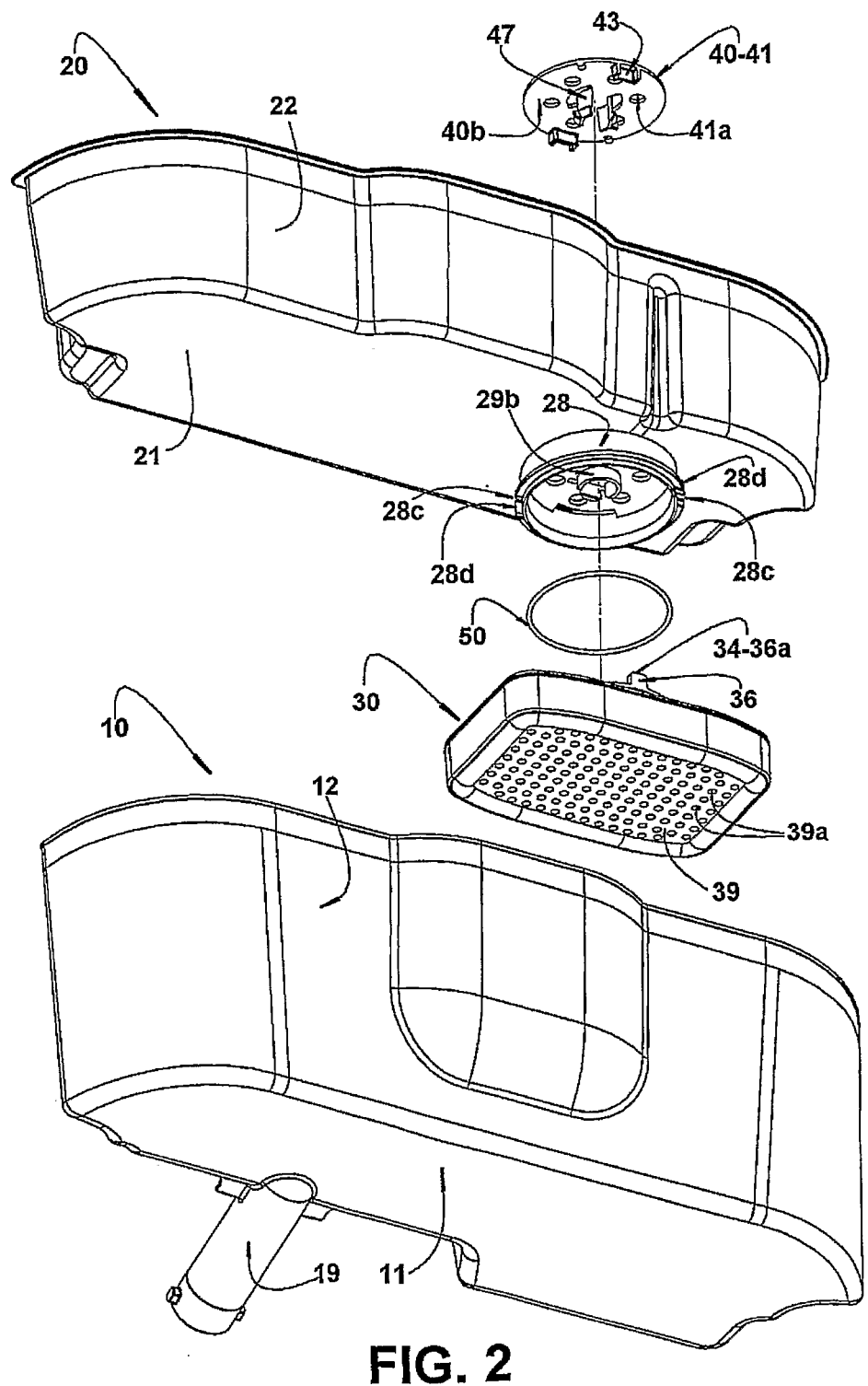
FIG. 2 is an exploded bottom perspective view of the set of components illustrated in FIG. 1.
Figure 2A:
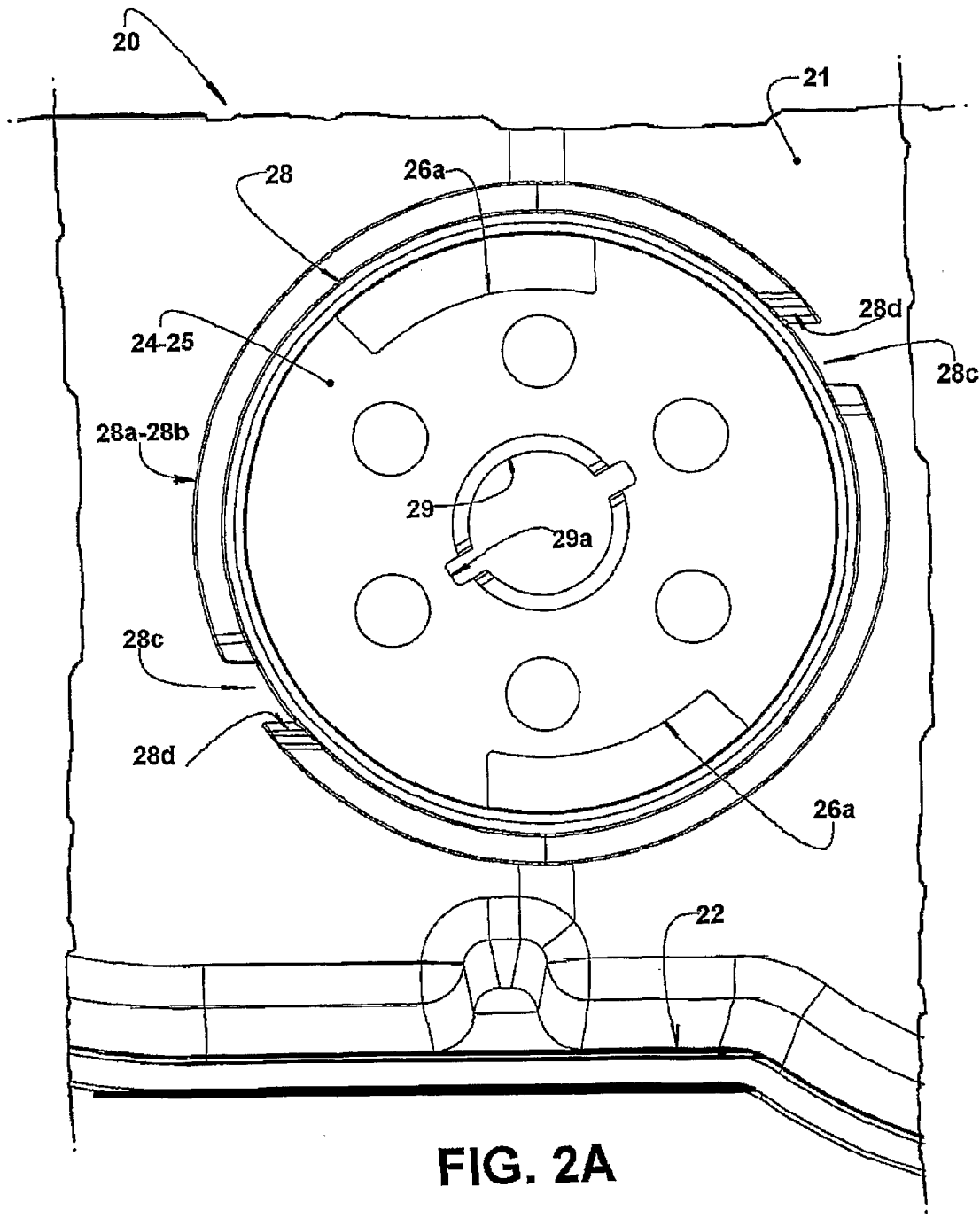
FIG. 2A is an enhanced partial bottom view of the bottom wall of the filling container, in the seat portion region.
Figure 3:
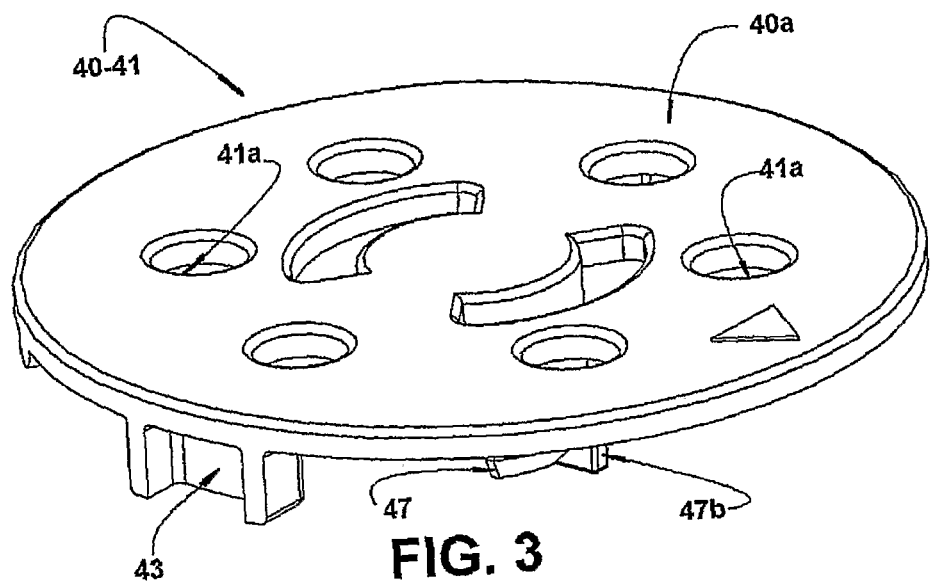
FIG. 3 is an enhanced top perspective view of the stopper element of the assembly arrangement according to the first configuration.
Figure 4:
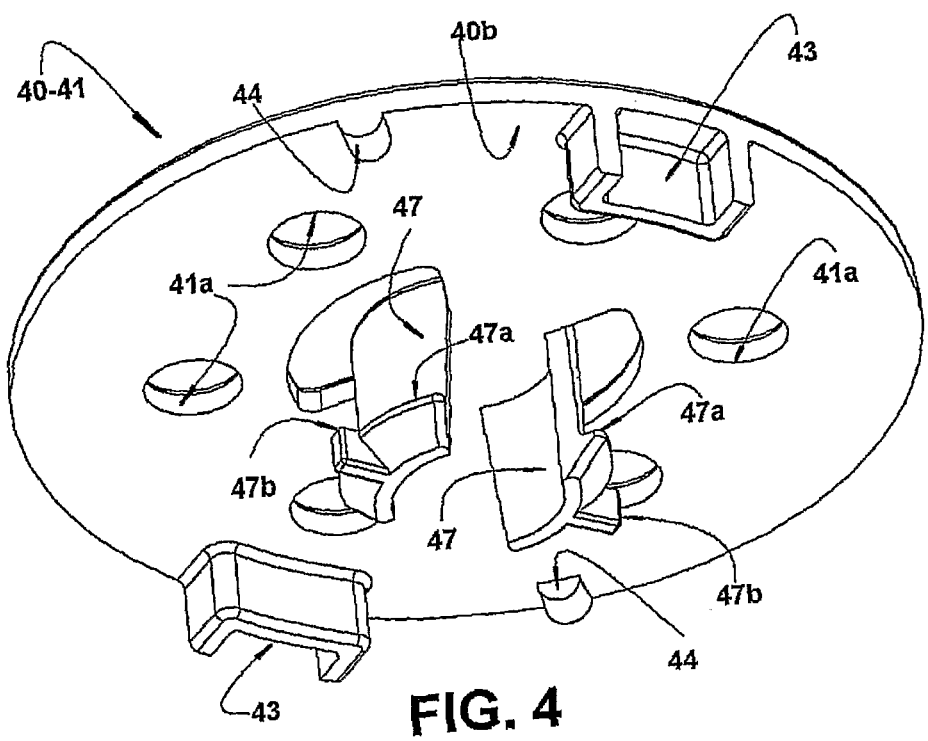
FIG. 4 is an enhanced bottom perspective view of the stopper element of FIG. 3.
Figure 5:
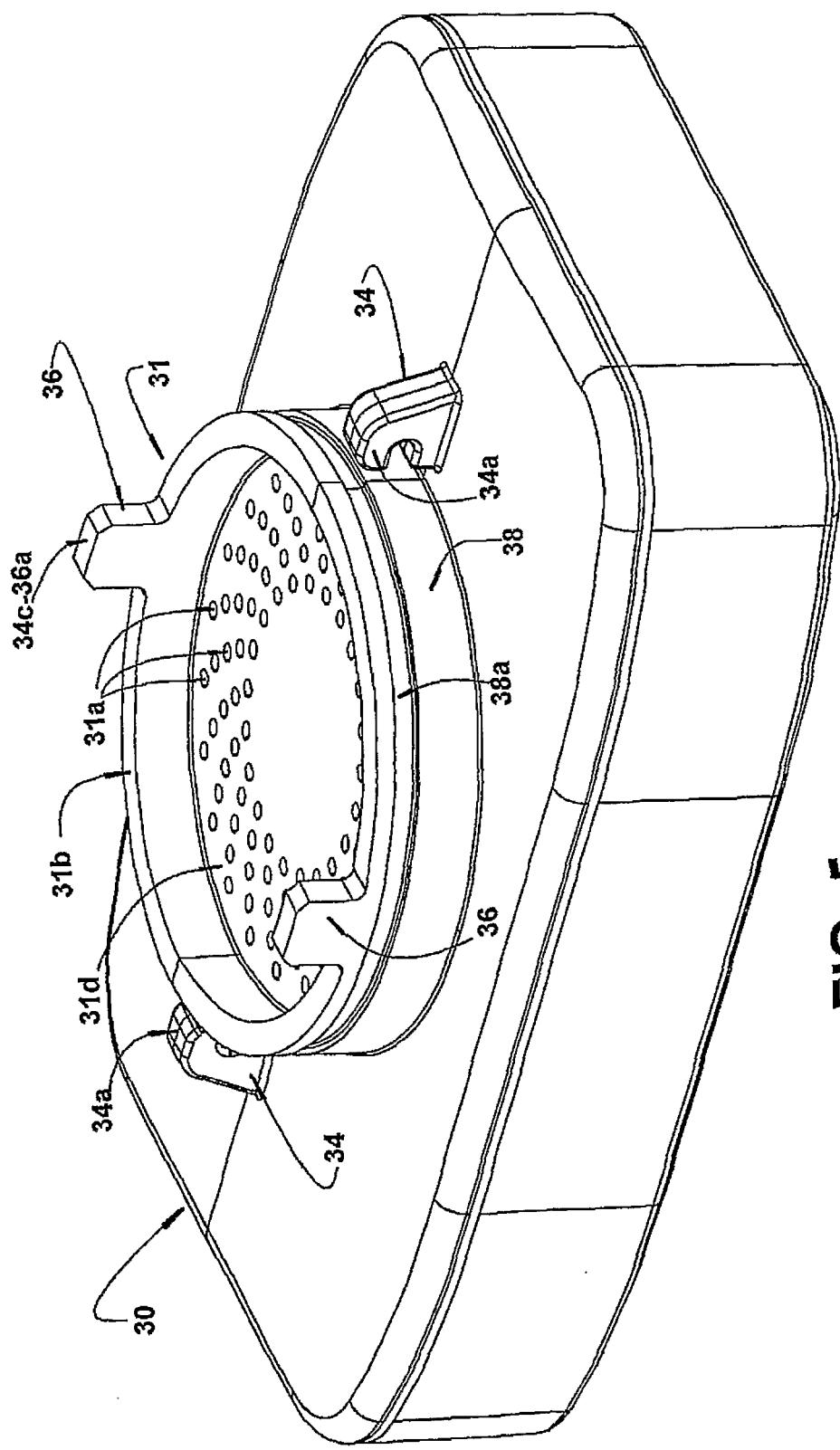
FIG. 5 is an enhanced top perspective view of the filter of FIGS. 1 and 2, illustrating the construction of its top end face.
Figure 7A:
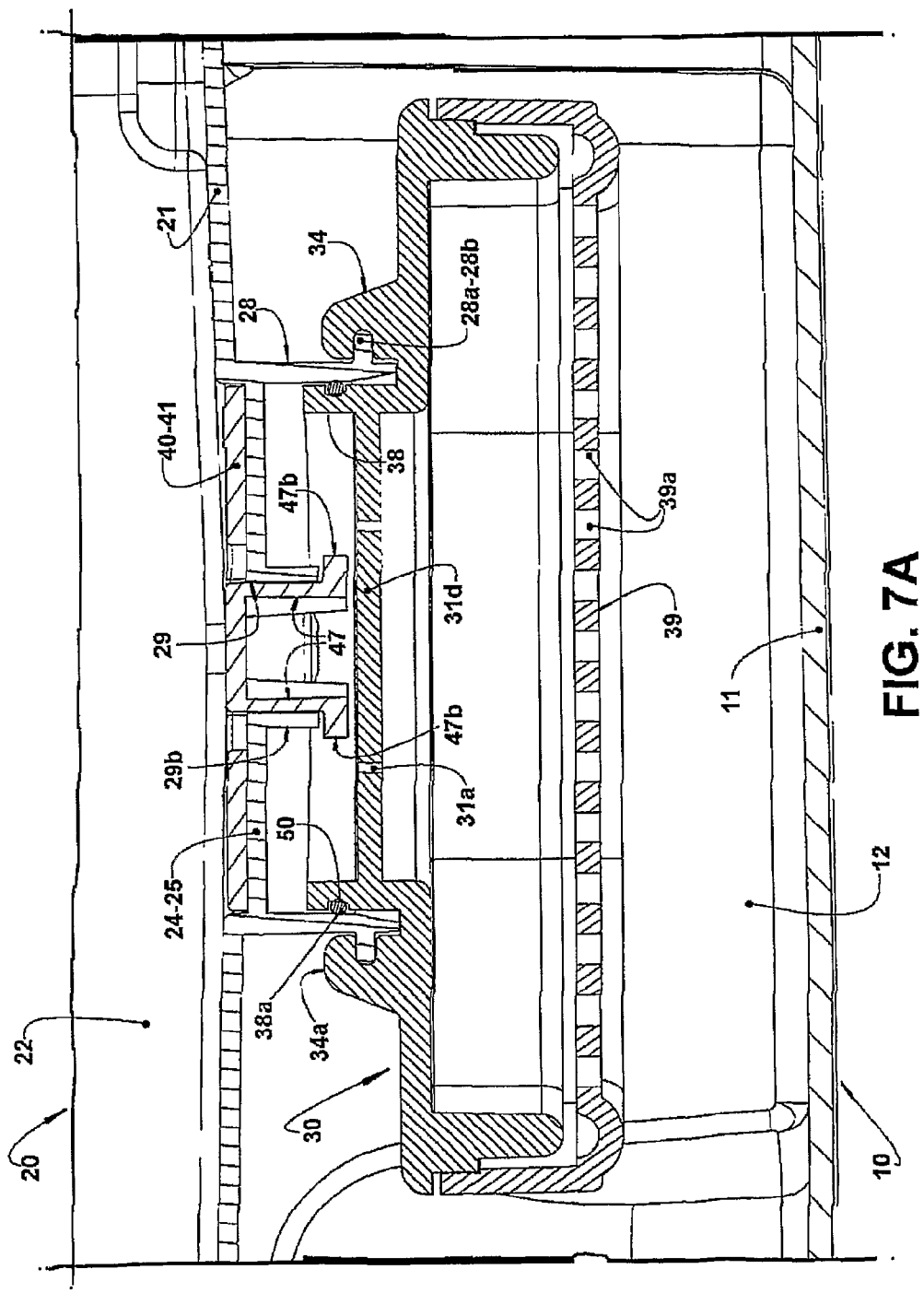
FIG. 7A is a enhanced detail of part of FIG. 7.
Figure 7B:
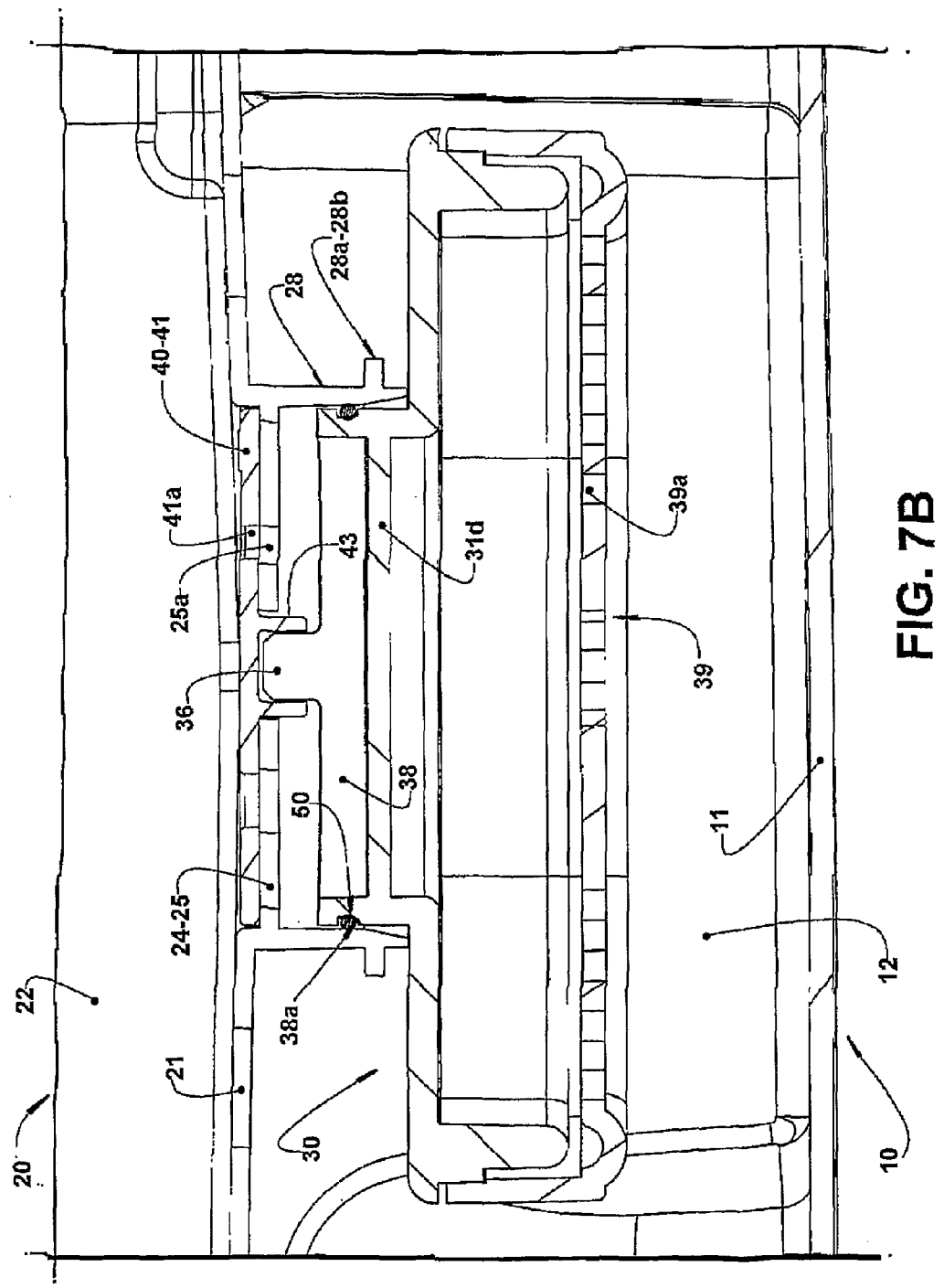
FIG. 7B is a partial cross-sectional view of the set of components, according to the first configuration and taken along line VIIB-VIIB of FIG. 6.
Figure 8:
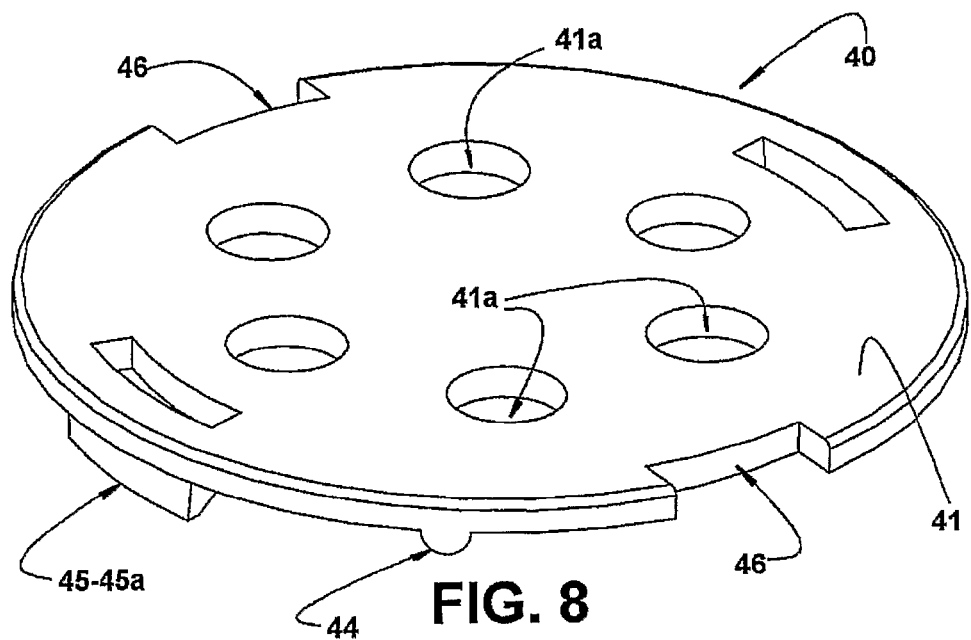
FIG. 8 is an enhanced top perspective view of a second configuration of the stopper element of the assembly arrangement.
Figure 9:
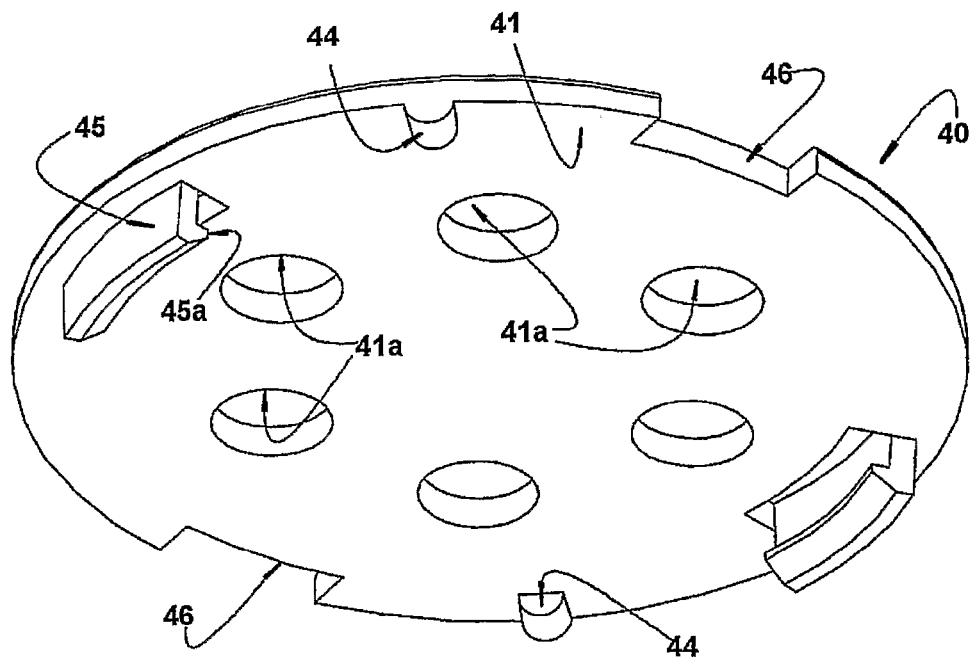
FIG. 9 is an enhanced bottom perspective view of the stopper element illustrated in FIG. 8.
Figure 10:
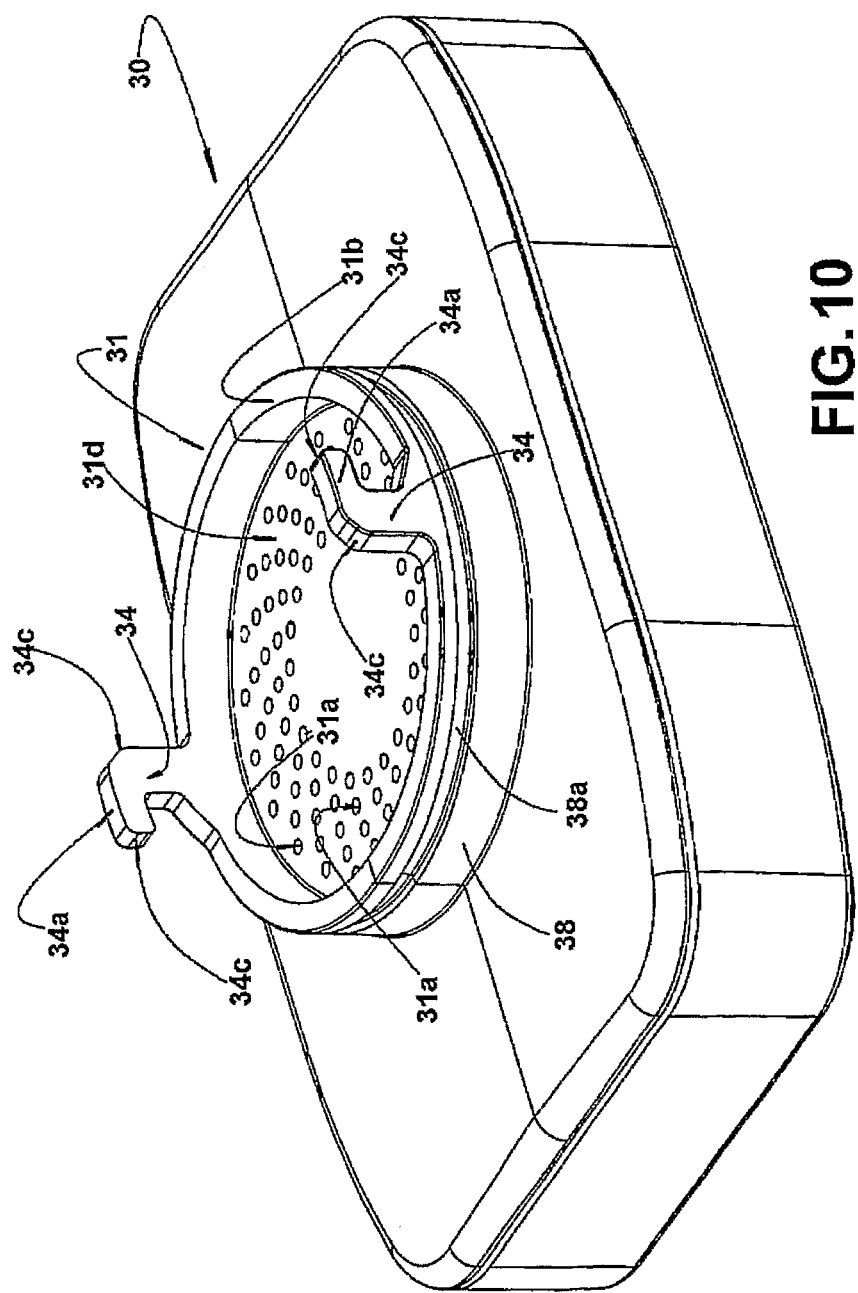
FIG. 10 is an enhanced top perspective view of a second constructive configuration for the filter, illustrating the construction of its top end face.

The constructive configuration illustrated on FIGS. 1 and 7A consider the stopper element 40 as a stopper disc 41, which is rotatably moved, by a corresponding rotation of the filter 40, between the open and closed positions. However, it should be understood that the seat portion 24, either comprising or not a recess 25, and the stopper element 40 can be built with any polygonal contour, allowing the operational displacements of the filter and the stopper element to be linear or even independent from each other. FIGS. 8 to 14 illustrate a second configuration of the invention in question, according with which the tubular projection 31b, of the upper face 31 of the filter 30, incorporates two or more locking latches 34, in the shape of an inverted L and with a upper horizontal leg 34a spaced apart from said tubular projection 31b of the upper face 31 of the filter 30. On the other hand, the recess 25 of the bottom wall 21 of the filling container 20, is provided with the same number of latch receiving means 26 defined by passing slots 26a (see FIG. 13), angularly arranged spaced apart from each other along a circular alignment which is peripheral and internal to the recess 25, each passing slot 26a receives a respective locking latch 34, which upper horizontal leg 34a is arranged through the respective passing slot 26a and seated over the recess 25 of the bottom wall 21 of the filling container 20, next to the end of the respective passing slot 26a, when the filter 30 is rotated to its assembled position, illustrated on FIGS. 11, taking with it the stopper disc 41 to the open condition also shown on FIGS. 11, with the graphical representation of the water inlet orifices 31a of the filter 30, visible during the axial alignment of the openings 41a of the stopper disc 40 with the respective windows 25a of the recess 25 which define the seat portion 24.

It should be understood that the sizing of the locking latches 34 is done, taking into account the thickness of the bottom wall 21 of the filling container 20, so that, when the filter 30 and the stopper disc 41 are moved to the assembled position of the first one and the open one of the second one, the locking latches 34 are forcibly seated over the recess 25 of the bottom wall 21, of the filling container 20, assuring a secure axial retention of the filter 30 to the filling container 20.

Figure 11:
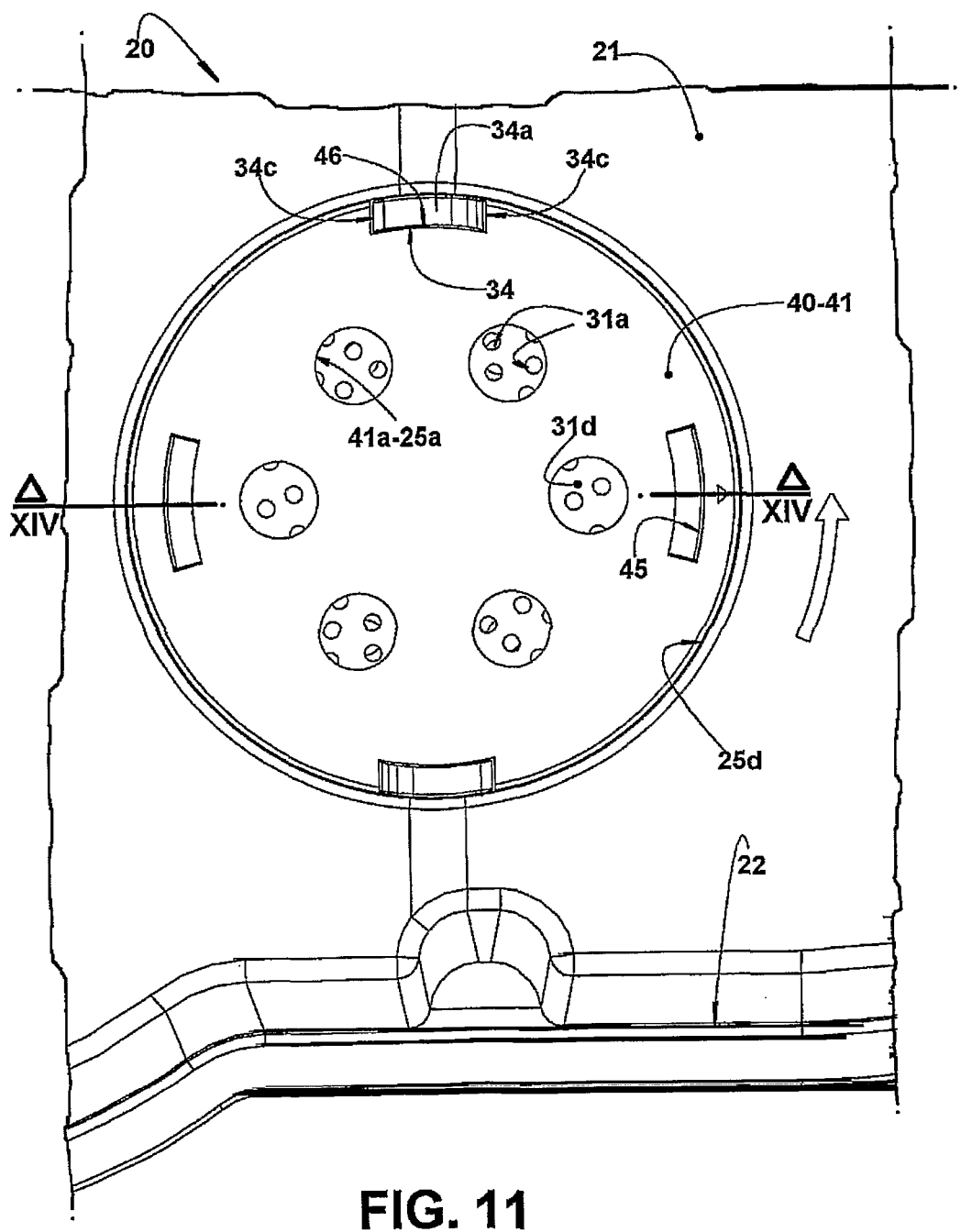
FIG. 11 is a partial top view of the assembly arrangement in question according to said second constructive solution, illustrating the filter in the assembled position under the filling container and with the stopper element in the open position.
Figure 12:
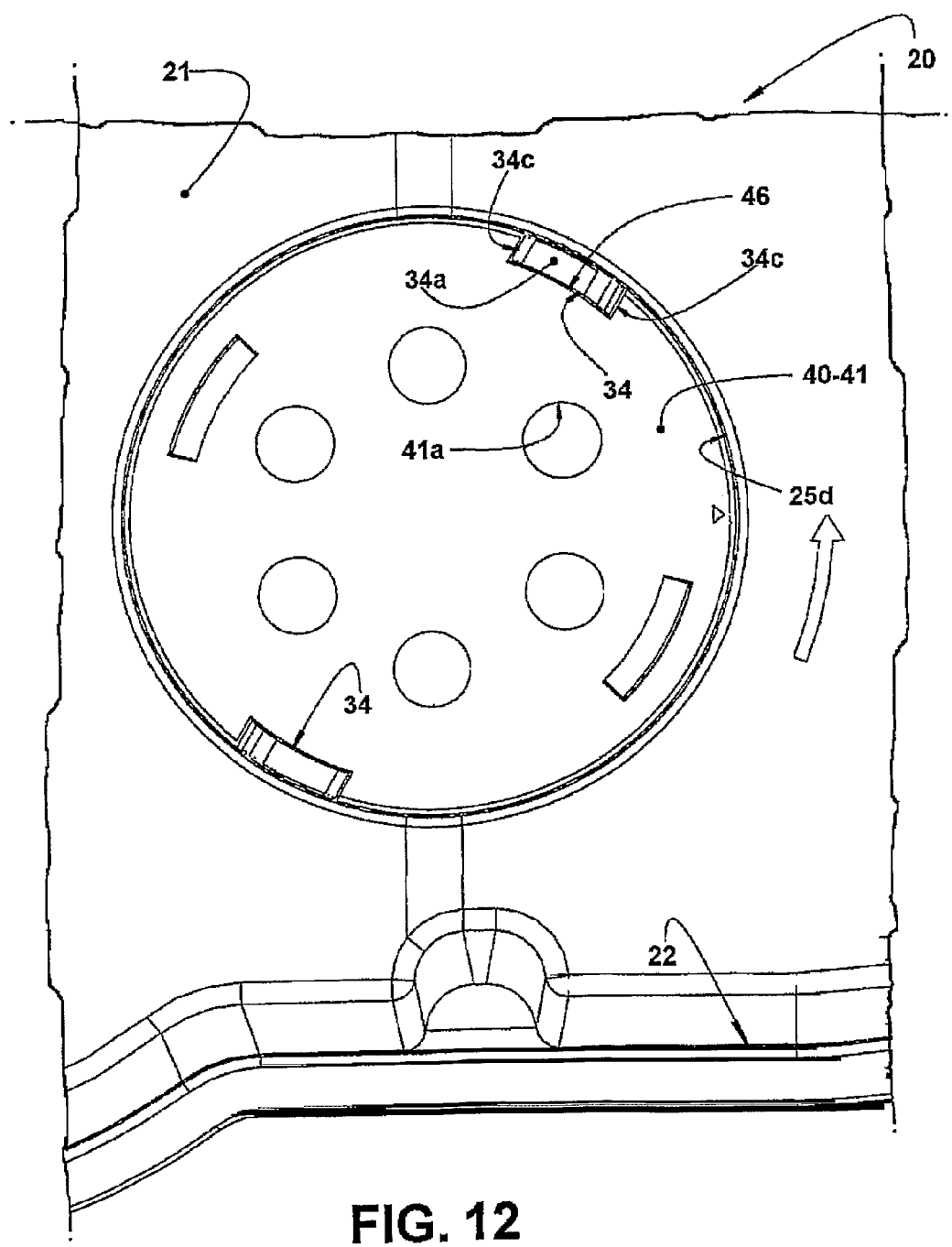
FIG. 12 is a view similar to that of FIG. 11, however illustrating the stopper element in the closed position and the filter in the release position.
Figure 13:
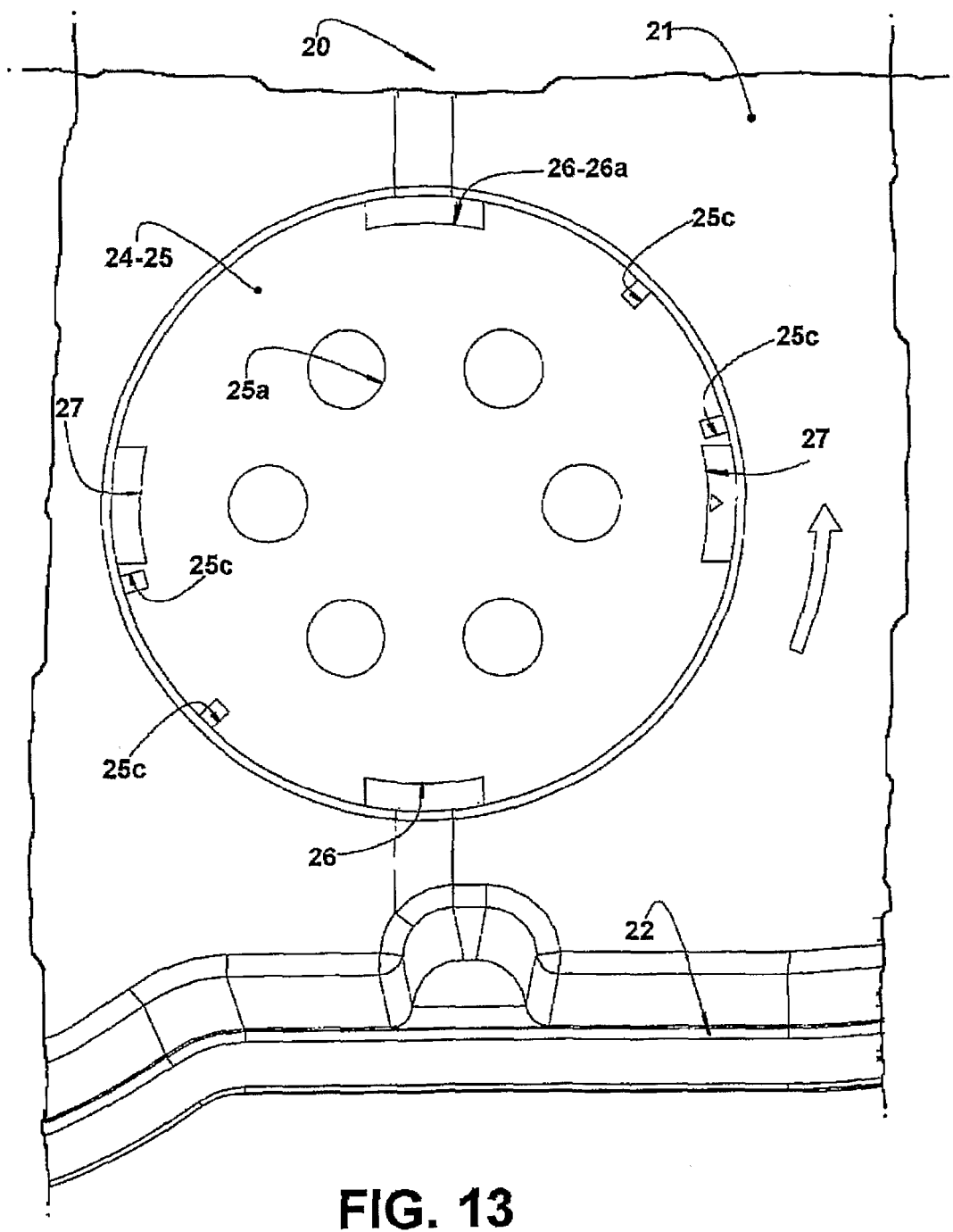
FIG. 13 is a top view of the bottom wall portion of the filling container, wherein the second configuration of the seat portion is provided, devoid of the stopper element and the filter.
Figure 14:
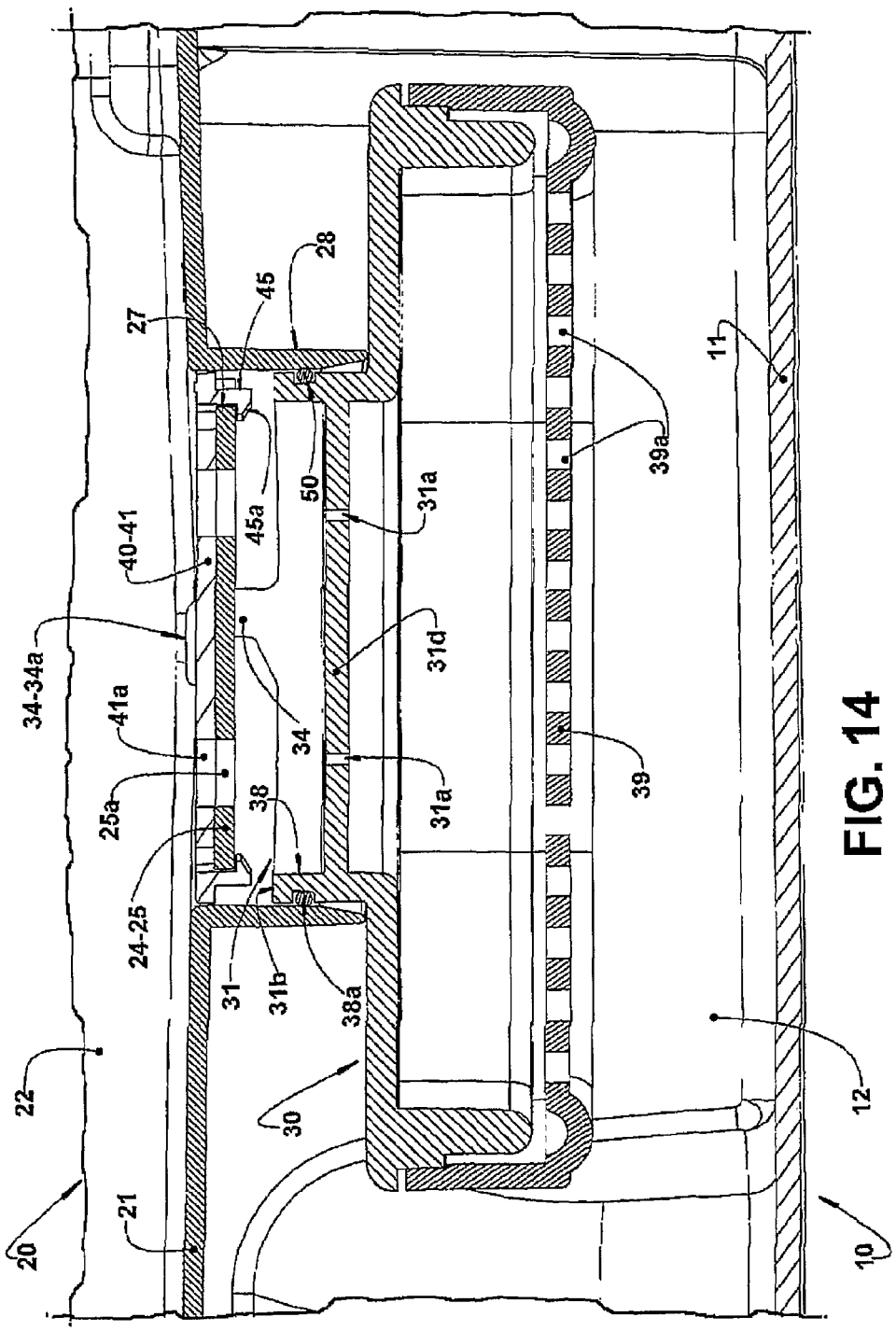
FIG. 14 is a partial cross-sectional view of the set of components of said second configuration and taken along line XIV-XIV of FIG. 11.
Figure 15:
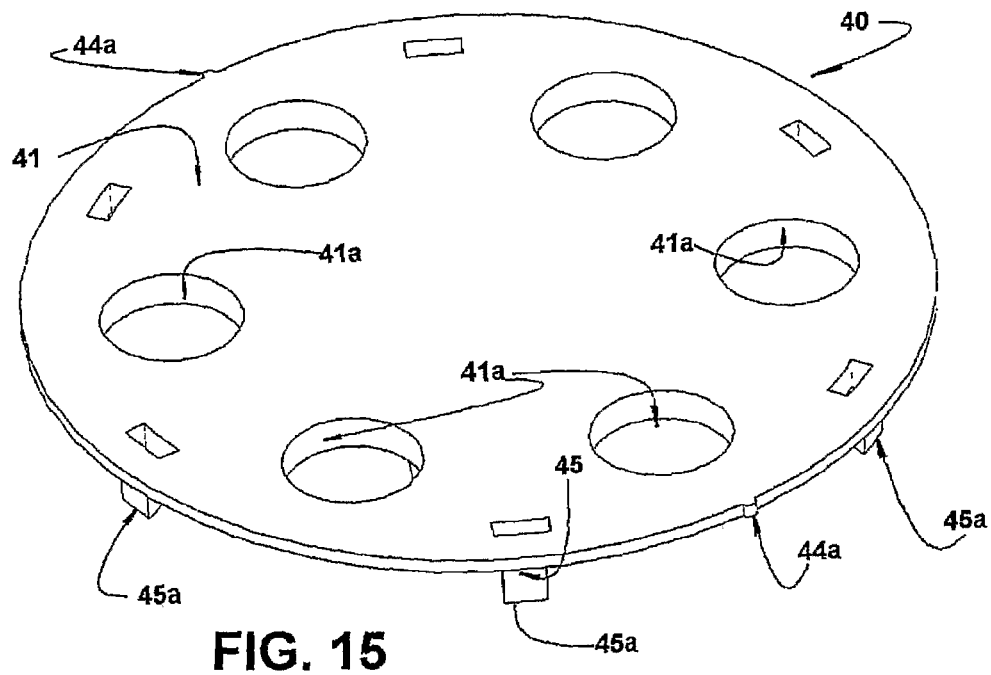
FIG. 15 is an enhanced top perspective view of a third configuration of the stopper element of the assembly arrangement.
Figure 16:
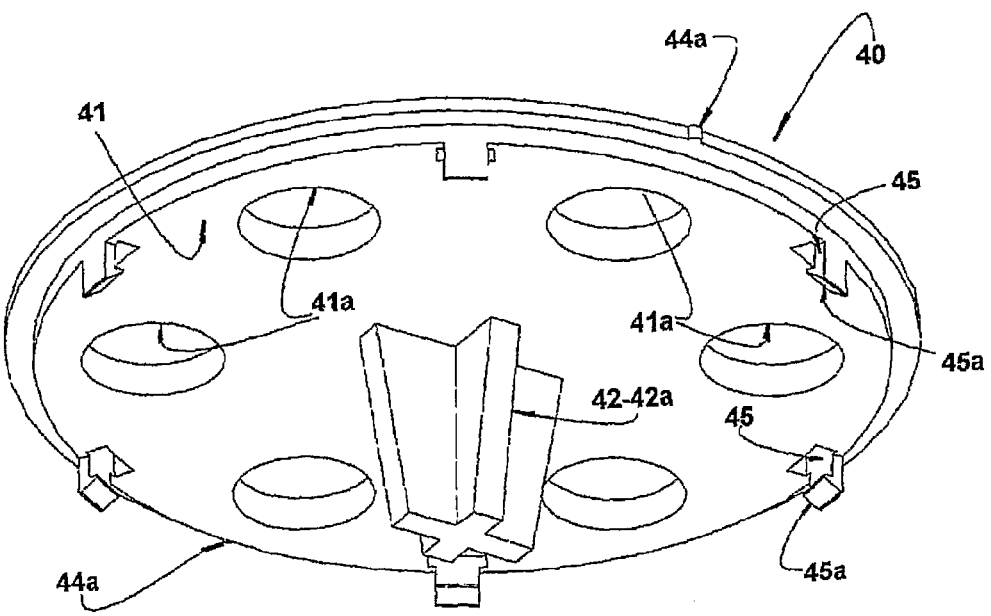
FIG. 16 is an enhanced bottom perspective view of the stopper element illustrated in FIG. 15.
Figure 17:
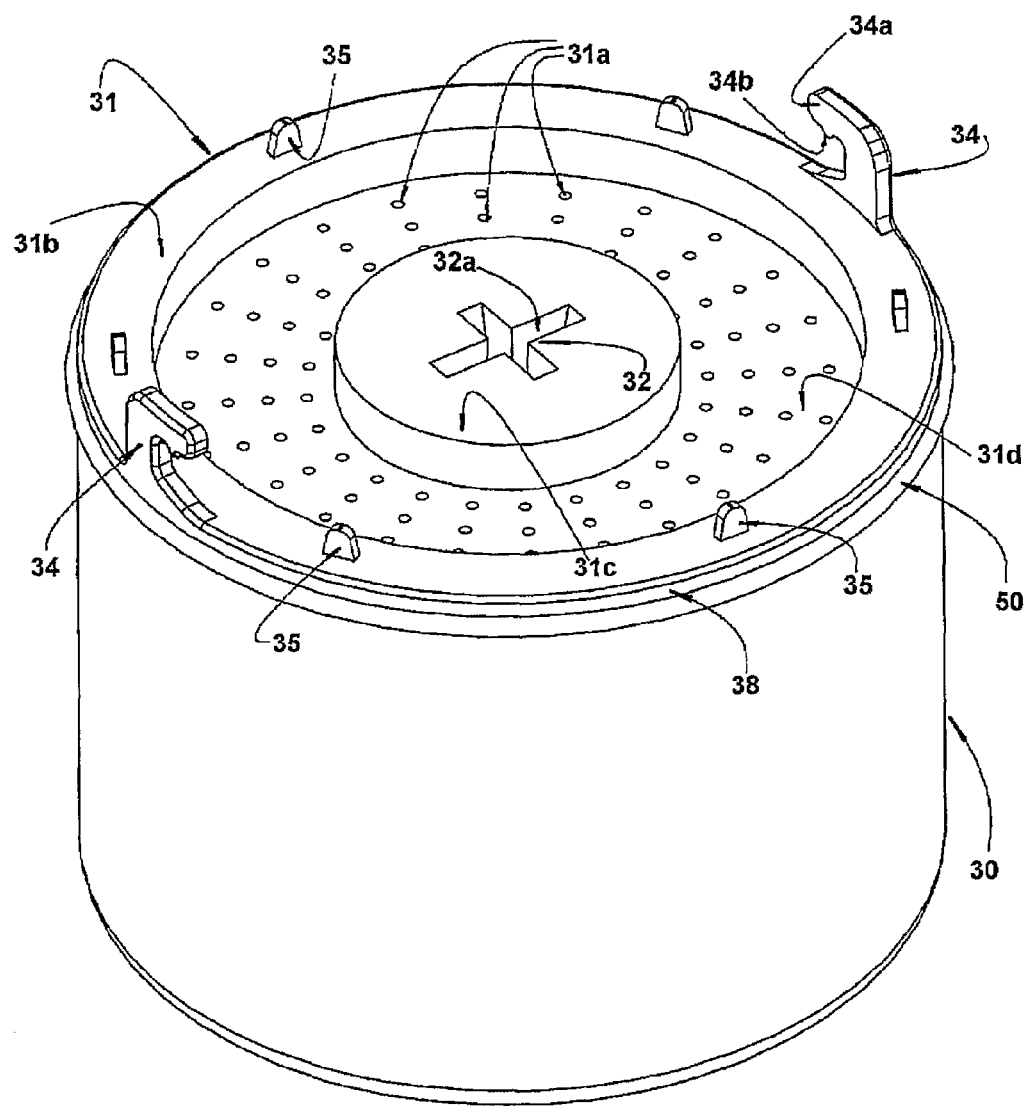
FIG. 17 is an enhanced top perspective view of a third constructive configuration for the filter, illustrating the construction of its top end face.

In order to allow coupling between the filter 30 and the stopper disc 41, the latter one is provided with two or more peripheral cutouts 46 presenting a width, in the radial direction, and length, in the circumferential direction, sufficient for each peripheral cutout 46 to house, in a substantially coplanar way, the upper horizontal leg 34a of a respective locking latch 34 of the filter 30, as shown on FIGS. 11 and 12. Thus, when the filter 30 is axially seated against the bottom wall 21 of the filling container 20, its locking latches 34 cross, each one, a respective passing slot 26a of the recess 25, in order to have its upper horizontal leg 34a housed, with a small clearance, in a respective peripheral cutout 46 of the stopper disc 41.

With the construction above, when the filter 30 is moved, that is, rotated around its axis, its locking latches 34 are circumferentially moved along the passing slots 26a, causing, with the engaging means 34c (see FIG. 10), defined by the opposed ends of its upper horizontal legs 34a, the angular displacement of the stopper disc 41 in the seat portion 24, that is, in the interior of the recess 25.

On the construction described above and shown on FIGS. 8 to 14, the filter 30 is also axially locked to the bottom wall 21 of the filling container 20 and still rotatably coupled to the stopper disc 41 by means of the locking latches 34.

In order that the stopper disc 41 be stabilized on its closed and open positions, it incorporates the same lower axial protuberances 44 already described for the stopper disc 41 of the configuration of FIGS. 1 to 7A, operating together with identical axial indents 26c of the recess 25.

In order to maintain the stopper disc 41 axially locked to the interior of the recess 25, the latter one is provided with guide slots 27, distant angularly from each other and arranged along a circular alignment, generally coinciding with the one of the passing slots 26a of the recess 25. On the other hand, the stopper disc 41 is provided with lower claws 45, incorporated in a single part and projecting downwardly, to cross, each one, a respective guide slot 27 of the recess 25. In the construction illustrated, each lower claw 45 is built in an elastically deformable way in a radial direction when forced during its fitting through the respective guide slot 27, and each lower claw 45 further incorporated an end tooth 45a which is slidably seated under the bottom wall 21 of the filling container 20, in the region of the recess 25, axially locking the stopper disc 41 in the interior of the recess 25, while allowing said stopper disc 41 to be rotated between its closed and open positions, by the corresponding rotation of the filter 30 between its assembly and release positions and assembled position, respectively.

As can be seen from the drawings, the stopper disc 41 and the recess 25 are provided with the same number of windows 25a and openings 41a, respectively, which are arranged equally spaced from each other according to respective circular alignments having the same radius and concentric to the axis of the set formed by the seat portion 24 and the stopper element 40.

On this second configuration it has also been provided a sealing ring 40 built and assembled as previously described, using the same reference numbers.

The constructing configuration shown on FIGS. 8 to 14 also considers the stopper element 40 as being a stopper disc 41, which is rotatably moved, by a corresponding rotation of the filter 30, between its open and closed positions. However, it should be understood that the sea portion 24, either comprising or not a recess 25, and the stopper element 40 can be built with any polygonal contour, allowing the operational displacements of the filter and the stopper element to be linear even independent from each other.

FIGS. 15 to 21 show a third configuration of the assembly arrangement in question according with which the stopper disc 41 incorporates, preferably in a single part, lower and central coupling means 42, whose function is to allow the rotational coupling between the filter 30 and the stopper element 40 in the shape of a stopper disc 41.

According with said third configuration, the upper end face 31 of the filter 30 is provided with a central engaging means 32, to be rotatably coupled with the coupling means 42, through a central window 25b (see FIGS. 20 and 21) provided on the recess 25, during seating of the upper end face 31 of the filter 30 against the bottom wall 21 of the filling container 20.

On said third configuration, the coupling means 42 is defined by a central lower projection 42a of the stopper disc 41, generally formed in a single part with the latter one and arranged through the central window 25b of the recess 25. On the other hand, the central engaging means 32 is defined by a recess 32a provided on the upper end face 31 of the filter 30.

On the constructive configuration shown on FIGS. 15 to 21, the central lower projection 42a of the stopper disc 41 and the recess 32a, of the upper end face 31 of the filter 30, present a cross shaped transversal section, having asymmetric orthogonal extensions, in order to allow that the coupling of the filter 30 to the stopper disc 41 may only occur between two rotational positions out of phase in 180° from each other. Such coupling characteristic is desirable due to the operational relationship to be obtained between the filter 30, the stopper disc 41 and the bottom wall 21 of the filling container 20. In order to avoid water accumulating in the interior of the recess 32a of the upper end face 31 of the filter 30, said recess 32a is provided with lower holes 32c open to the interior of the filter 30, as best shown on FIG. 21.

As shown on FIGS. 15 to 21, the filter 30, on its third configuration, can be built in a similar way to the filter described in relation to FIGS. 8 to 14, the same reference numbers indicating the same components. On this third configuration, the upper end face 31 of the filter 30 comprises a tubular projection 31b to be seated against the bottom wall 21 of the filling container 20, a central portion 31c carrying the central engaging means 32 and a recessed annular portion 31d arranged between the tubular projection 32b and the central portion 31c and wherein there are provided the water inlet orifices 31a.

On the third configuration, for the axial retention of the filter 30 to the filling container 20, the tubular projection 31b, of the upper end face 31 of the filter 30, also incorporates two or more locking latches 34, in the shape of an inverted "L" and with the upper horizontal leg 34a spaced apart from said tubular projection 31b of the upper end face 31 of the filter 30. However, in this construction the bottom wall 21 of the filling container 20 is provided with the same number of passing slots 26a, angularly arranged spaced apart from each other along a circular alignment circumscribed to the recess 25, each passing slot 26a receives a locking latch 34, the upper horizontal leg 34a of which is arranged through the respective passing slot 26a and seated over the bottom wall 21 of the filling container 20, next to the end of the respective passing slot 26a, when the filter 30 is rotated to its assembled position, shown on FIG. 20, taking with it the stopper disc 41 to the open condition shown on FIG. 12, with the graphical representation of the water inlet orifices 31a of the filter 30, visible during the axial alignment of the openings 41a of the stopper disc 40 with the respective windows 25a of the recess 25 which define the seat portion 24.

The tubular projection 31b of the upper end face 31 of the filter 30 can further incorporate a plurality of axial shoulders 35, arranged according to a circular alignment and to be seated against the bottom wall 21 of the filling container 20, when the filter 30 is moved (rotated) to the assembled position.

It should be understood that the sizing of the axial shoulders 35 and of the locking latches 34 is done, taking into account the thickness of the bottom wall 21 of the filling container 20, so that when rotating the filter 30 and the stopper disc 41 to the assembled position of the first one and the open one of the second, the locking latches 34 are forcibly seated on the lower wall 21, of the filling container 20, assuring a secure axial retention of the filter 30 on the filling container 20.

In order to assure a suitable stable retention of the filter 30 on its assembled position on the filling container 20, the upper horizontal leg 34a, of each locking latch 34, incorporates a lower end shoulder 34b, the bottom wall 21 of the filling container 20 is provided, on the interior of the latter one and next to one of the ends of each passing slot 26a, with a recess 26b on the interior of which it is removably fitted the lower end shoulder 34b of a respective locking latch 34, when the filter 30 is rotated to the assembled position illustrated on FIG. 11.

On the third construction illustrated, in order that the stopper disc 41 is stabilized on its closed and open positions, it incorporates at least a radical protuberance 44a, while the recess 25 shows a peripheral wall 25d provided on two respective indents 25e, angularly distant from each other, so that said radial protuberance 44a, of the stopper disc 41, is fitted in one and in the other one of said indents 25d when the stopper disc 41 is rotated to one and to the other one, respectively, of its closed and open positions. Thus, when the filter 30 is rotated, from the assembled position to the assembly and release position, in the direction contrary to the one of the arrows shows on FIGS. 18 and 19 the stopper disc is forced to rotated in the same direction, causing its two radial protuberances 22a to be moved from one of the indents 25e to the other indent 25e of the peripheral wall 25d of the recess 25, stabilizing and maintaining the stopper disc 41 in the closed position, during the period when the filter 30 is detached from the filling container 20 in order to be replaced by a new filter 30.

In order to maintain the stopper disc 41 axially locked in the interior of the recess 25, the latter one is provided with guide slots 27, angularly distant from each other and arranged along a circular alignment. On the other hand, the stopper disc 41 is provided with lower claws 45, incorporated in a single part and projecting downwardly, to cross over, each one, a respective guide slot 27 of the recess 25. In the construction illustrated, each lower claw 45 is constructed in order to be elastically deformable in a radial direction when forced during its fitting through the respective guide slot 27, each lower claw 45 further incorporating an end tooth 45a which is slidably seated under the bottom wall 21 of the filling container 20, in the region of the recess 25, axially locking the stopper disc 41 in the interior of the recess 25, while allowing said stopper disc 41 to be rotated between its closed and open positions, by the corresponding rotation of the filter 30 between its assembly and release positions and assembled position, respectively.

As can be observed from the drawings, the stopper disc 41 and the recess 25 are provided with the same number of windows 25a and openings 41a, as already described on the first and second configurations.

The filter 30 shown on FIGS. 15 to 21 also presents a lower end face 39 provided with a plurality of water outlet orifices 39a.

In spite of being illustrated herein only three possible embodiments of the assembly arrangement in question, it should be understood that alterations can be made in both the form and arrangement of the component parts, without departing from the constructive concept defined on the claims which are attached to this specification.

The invention claimed is:

1. Filter assembly arrangement for a water dispensing storing device comprising a reservoir (10) provided of an upper opening (14), a filling container (20) having a bottom wall (21) removably mounted on the upper opening (14) of the reservoir (10) and to which a filter (30) is mounted, the arrangement being characterized in that:
the bottom wall (21) of the filling container (20) having a seat portion (24) provided of at least one window (25a);
a stopper element (40) being provided and having at least one opening (41a) and being axially held and supported against the seat portion (24), so as to be moved between a closed position, blocking the window (25a) of seat portion (24) and an open position wherein an opening (41a) of said stopper element (40) remains axially aligned with the respective window (25a) of the seat portion (24);
the filter (30) being provided of water inlet orifices (31a) and hermetically seated against the bottom wall (21) of the filling container (20), so as to be selectively moved between an assembly and release position and an assembled position, in which it remains axially held against the bottom wall (21) of the filling container (20), communicating the water inlet orifices with the container (10) by means of the filter (30), the window (25a), the seat portion (24) and a respective opening (41a) of the stopper element (40) when moved to the open position; wherein the stopper element (40) has opposed end faces (40a, 40b), one of them being seated against the seat portion (24) and carrying axial claws (45), the bottom wall (21) of the filling container (20) being provided of at least one guide slot (27) disposed in the seat portion (24), and each axial claw (45) being disposed through the guide slot (27) and incorporating one end teeth (45a) to be slidably seated against said bottom wall (21), in one side opposed to the side the stopper element (40) is seated, so as to axially lock the stopper element against the seat portion (24).

2. Arrangement, according to claim 1, characterized in that the stopper element (40) and the seat portion (24) are provided within the filling container (20), the axial claws (45) of the stopper element being projected under the seat portion, crossing the respective guide slot (27) and having its end teeth (45a) slidably seated under the bottom wall (21) of the filling container (20).

3. Arrangement, according to claim 2, characterized in that the seat portion (24) is defined by a recess (25) provided in the bottom wall (21) of the filling container (20) and within which the stopper element (40) is moved between its closed and open position.

4. Arrangement, according to claim 3, characterized in that the recess (25) has a circular shape, the stopper element (40) being defined by a stopper disc (41) supported within the recess (25), so as to be rotated at its operational movement between the open and closed positions.

5. Arrangement, according to claim 4, characterized in that the filter (30) has an upper face (31) and a lower face (39), one of which incorporates at least two locking latches (34) to be coupled to at least a locking receiving means (26, 28a), provided in the bottom wall (21) of the filling container (20), thereby axially locking the filter (30) when moved from its assembly and release position to its assembled position.

6. Arrangement, according to claim 5, characterized in that the bottom wall (21) of the filling container (20) downwardly incorporates a cylindrical tubular projection (28) circumscribed to said seat portion (24) and the upper face (31) of the filter (30) comprising a tubular projection (31b) circumscribing a recessed median portion (31d) wherein the water inlet orifices (31a) are provided, said upper face (31) incorporating the locking latches (34).

7. Arrangement, according to claim 6, characterized in that the locking receiving means (28a) is defined by a circumferential flap (28b) outwardly incorporated to the cylindrical tubular projection (28) of the bottom wall (21) of the filling container (20) and provided of cutouts (28c), the locking latches (34) having an inverted L shaped and positioned externally to the tubular projection (31b) of the upper face of the filter (30), so as to have its upper horizontal leg (34a) axially passed through the respective cutouts (28c) when the filter (30) is in the release and assembly position and seated over the circumferential flap (28b) when the filter (30) is angularly moved to its assembled position.

8. Arrangement, according to claim 7, characterized in that the circumferential flap (28b) incorporates an upper stop (28d) adjacent each cutout (28c) so as to allow the angular movement of the filter (30) in one way only, from the assembly and release position to the assembled position.

9. Arrangement, according to claim 7, characterized in that the recess (25) is centrally provided of a guide bore (29) radially expanded by at least one radial slot (29a), the stopper disc (41) incorporating lower claws (47) projecting downward, radial and elastically collapsible and defining concentrically cylindrical circumferential portions having the same curvature radius to be fitted and rotatably supported in the interior of the guide bore (29), crossing the same, each lower claw (47) incorporating an end teeth (47a) which is slidably seated against the filling container (20), under its bottom wall (21), axially locking the stopper disc (41) to the filling container (20).

10. Arrangement, according to claim 9, characterized in that the bottom wall (21) of the filling container (20) incorporates in an inferior position, a tubular shoulder (29b) having an end annular edge against which the end teeth (47a) of each lower claw (47) is seated.

11. Arrangement, according to claim 9, characterized in that at least one lower claw (47) incorporates a little radial projection (47b) engageable through a respective radial slot (29a) of the recess (25), so as to define at least one angular assembly position of the stopper disc (41) in the seat portion (24).

12. Arrangement, according to claim 9, characterized in that the stopper disc (41) incorporates at least one lower axial protuberance (44), the recess (25) having two respective axial indents (25c), to which the lower axial protuberances (44) are fitted when the stopper disc (41) is rotated to one and the other, respectively, of its closed and open positions.

13. Arrangement, according to claim 6, characterized in that the upper face (31) of the filter (30) incorporates two or more axial latches (36), the recess (25) of the seat portion (24) being provided of an identical number of locking receiving means (26) defined by throughout slots (26a) angularly disposeda4 away from each other along the peripheral circular alignment and within the recess (25) and the stopper disc (41) being provided in an inferior position of two or more housings (43), each axial latch (36) being received through a respective throughout slot (26a), so as to have its free end (36) loosely fitted in a housing (43) of the stopper disc (41), rotatably coupling a5the stopper disk to the filter (30) when it is seated against the bottom wall (21) of the filling container (20).

14. Arrangement, according to claim 6, characterized by comprising a plurality of locking receiving means (26) defined by throughout slots (26a) angularly arranged away from each other along the peripheral circular alignment and within the recess (25), the locking latches (34) having an inverted L shape, and its upper horizontal leg (34a) axially crossing through the respective throughout slots (26a), when the filter (30) is in its release and assembly position and seated under the recess 925) when the filter is rotated to its assembled position.

15. Arrangement, according to claim 6, characterized in that the stopper disc (41) is provided of at least two peripheral cutouts (46), in each of which an upper horizontal leg (34a) of a respective locking latch (34) is housed, said upper horizontal leg (34a) having opposed ends which define engaging means (34c) for rotatably coupling the filter (30) to the stopper disc (41).

16. Arrangement, according to claim 6, characterized in that the stopper disc (41) incorporates at least one lower axial protuberance (44), while the recess (25) has two respective axial indents (25c), within which the lower axial protuberance (44) is fitted when the stopper disc (41) is rotated for one and the other, respectively, of its closed and open positions.

17. Arrangement, according to claim 6, characterized by comprising a plurality of locking receiving means (26) defined by throughout slots (26a) angularly spaced away from each other along the peripheral circular alignment circumscribed to the recess (25), the locking latches (34) having an inverted L shape, and its upper horizontal leg (34a) axially crossing through the respective throughout slots (26a), when the filter (30) is in its release and assembly position and seated on the bottom wall (21) of the filling container (20), near one of the ends of the respective throughout slots (26a) when the filter is rotated to its assembled position.

18. Arrangement, according to claim 17, characterized in that the recess (25) is provided with a central window (25b), the stopper disc (41) incorporating, inferiorly and centrally, a coupling means (42) arranged through said central window (25b) and the filter (30) being provided, in its upper face (31), of a engaging means (32) which is rotatably coupled to said coupling means (42) of the stopper disc (41) when seating the filter (30) against the bottom wall (21) of the filling container (20).

19. Arrangement, according to claim 18, characterized in that the coupling means (42) is defined by a central lower projection (42a) of the stopper disc (41), disposed through the central window (25b) of the recess (25) and the central engagement means (32) being defined by a recess (32a) provided in one upper end face (31) of the filter (30).

20. Arrangement, according to claim 19, characterized in that the central lower projection (42a) of the stopper disc (41) and the recess (32a) of the upper end face (31) of the filter (30) have a cross-section having a cross shape with asymmetrical orthogonal extensions.

21. Arrangement, according to claim 19, characterized in that the recess (32a) of the upper end face (31) of the filter (30) is provided of lower orifices (32c) open to the interior of the filter (30).

22. Arrangement, according to claim 17, characterized in that the upper horizontal leg (34a) of each locking latch (34) incorporates one end lower shoulder (34b), the bottom wall (21) of the filling container (20) being provided withina6 the end lower shoulder and along with one of the ends of each throughout slot (26a), a recess (26b) within which an end lower shoulder (34b) of a respective locking latch (34) is fitted, when the filter (30) is rotated to its assembled position.

23. Arrangement, according to claim 17, characterized in that the stopper disc (41) incorporates at least one radial protuberance (44a), the recess (25) having a peripheral wall (25d) provided of two indents (25e) angularly spaced, said radial protuberance (44a) of the stopper disc being fitted in one and the other of the indents (25e) when the stopper disc (41) is rotated for one and the other, respectively, of its closed and open positions.

24. Arrangement, according to claim 6, characterized in that the stopper disc (41) and the recess (25) are provided of the same number of windows (25a) and openings (41a), respectively, equally spaced one to the other, according to respective circular alignments of the same radius and concentric to the axis of the stopper disc (41) and the recess (25).

25. Arrangement, according to claim 6, characterized by further comprising at least one sealing ring (50) which is compressed between the filter (30) and the bottom wall (21) of the filling container (20), when the filter (30) is taken to the assembly and release and assembled positions.

26. Arrangement, according to claim 25, characterized in that the sealing ring (50) is compressed between a circular tubular projection (28) and one cylindrical side wall portion (38) of the filter (30), adjacent said upper end wall (31).

27. Arrangement, according to claim 26, characterized in that the sealing ring (30) is partially housed within a peripheral channel (38a) provided in the cylindrical side wall portion (38) of the filter (30).

28. Arrangement, according to claim 1, characterized in that the filter (30), when seated against the bottom wall (21) of the filling container (20), is coupled to the stopper element (40), so as to move a7the stopper element from the closed position to the open position and further from the open position to the closed position, when the filter (30) is moved from the release and assembly position to the assembled position and froma8 the assembled position to the release and assembly position to the first, respectively.

* * * * *